(12) United States Patent
Park et al.

(10) Patent No.: US 10,123,331 B2
(45) Date of Patent: Nov. 6, 2018

(54) METHOD AND APPARATUS FOR TRANSMITTING FEEDBACK FRAME IN WIRELESS LOCAL AREA NETWORK SYSTEM

(71) Applicant: LG ELECTRONICS INC., Seoul (KR)

(72) Inventors: Eunsung Park, Seoul (KR); Jinyoung Chun, Seoul (KR); Jinsoo Choi, Seoul (KR); Dongguk Lim, Seoul (KR); Hangyu Cho, Seoul (KR)

(73) Assignee: LG ELECTRONICS INC., Seoul (KR)

(*) Notice: Subject to any disclaimer, the term of this patent is extended or adjusted under 35 U.S.C. 154(b) by 144 days.

(21) Appl. No.: 15/376,563

(22) Filed: Dec. 12, 2016

(65) Prior Publication Data

US 2017/0171860 A1  Jun. 15, 2017

Related U.S. Application Data

(60) Provisional application No. 62/267,845, filed on Dec. 15, 2015, provisional application No. 62/269,108, filed on Dec. 18, 2015, provisional application No. 62/270,050, filed on Dec. 21, 2015.

(51) Int. Cl.
*H04W 84/12* (2009.01)
*H04W 72/04* (2009.01)
*H04L 5/00* (2006.01)

(52) U.S. Cl.
CPC ......... *H04W 72/0453* (2013.01); *H04L 5/006* (2013.01); *H04L 5/0039* (2013.01); *H04L 5/0094* (2013.01); *H04L 5/0023* (2013.01); *H04L 5/0048* (2013.01); *H04L 5/0064* (2013.01); *H04W 84/12* (2013.01)

(58) Field of Classification Search
CPC . H04W 72/0453; H04W 84/12; H04W 80/04; H04W 72/04
See application file for complete search history.

(56) References Cited

U.S. PATENT DOCUMENTS

| | | | |
|---|---|---|---|
| 2012/0039406 A1* | 2/2012 | Srinivasa | H04L 1/0693 375/260 |
| 2013/0195607 A1* | 8/2013 | Adhvaryu | F04D 23/008 415/1 |
| 2014/0056205 A1* | 2/2014 | Aboul-Magd | H04W 72/0426 370/312 |
| 2014/0376355 A1* | 12/2014 | Kudo | H04B 7/0456 370/203 |
| 2015/0071233 A1* | 3/2015 | Wang | H04L 5/0094 370/329 |
| 2015/0071272 A1* | 3/2015 | Vermani | H04B 7/0452 370/338 |

(Continued)

*Primary Examiner* — Andrew Lee
(74) *Attorney, Agent, or Firm* — Lee, Hong, Degerman, Kang & Waimey

(57) ABSTRACT

Provided are a method and apparatus for transmitting a feedback frame in a WLAN system. More specifically, the first wireless STA receives a feedback request field, including an LTF, from a second wireless STA. The first wireless STA configures feedback information about a wireless channel corresponding to a predetermined frequency band using the feedback request field. The first wireless STA transmits the feedback information to the second wireless STA.

10 Claims, 17 Drawing Sheets

(56) References Cited

U.S. PATENT DOCUMENTS

| | | | |
|---|---|---|---|
| 2015/0156794 A1* | 6/2015 | Kwon | H04W 72/1231 370/329 |
| 2016/0080115 A1* | 3/2016 | Josiam | H04L 5/0094 370/329 |
| 2016/0127019 A1* | 5/2016 | Schelstraete | H04B 7/0626 370/252 |
| 2016/0380729 A1* | 12/2016 | Porat | H04B 7/0408 370/329 |
| 2017/0054542 A1* | 2/2017 | Vermani | H04L 5/0057 |
| 2017/0257153 A1* | 9/2017 | Xia | H04B 7/0617 |
| 2017/0264354 A1* | 9/2017 | Ghosh | H04B 7/0626 |

* cited by examiner

METHOD AND APPARATUS FOR TRANSMITTING FEEDBACK FRAME IN WIRELESS LOCAL AREA NETWORK SYSTEM

CROSS-REFERENCE TO RELATED APPLICATION

Pursuant to 35 U.S.C. § 119(e), this application claims the benefit of U.S. Provisional Patent Application Nos. 62/267,845, filed on Dec. 15, 2015, 62/269,108, filed on Dec. 18, 2015, and 62/270,050, filed on Dec. 21, 2015, the contents of which are all hereby incorporated by reference herein in their entirety.

BACKGROUND OF THE INVENTION

Field of the Invention

The present invention relates to wireless communications, and more particularly, to a method of transmitting a feedback frame in a wireless local area network (WLAN) system and an apparatus using the same.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY OF THE INVENTION

An aspect of the present specification is to provide a method of transmitting a feedback frame in a wireless local area network (WLAN) system and an apparatus using the same.

This specification proposes a method for transmitting a feedback frame based on a sounding procedure in a WLAN system.

Furthermore, there is proposed a method performed by a first wireless STA of a WLAN system, which supports a plurality of frequency resource units corresponding to different frequency bands.

First, terms are defined below. The first wireless STA may correspond to a beamformee or an STA, and a second wireless STA may correspond to a beamformer or an AP. The different frequency bands may correspond to 20 MHz, 40 MHz, 80 MHz, etc. The plurality of frequency resource units corresponding to the different frequency bands may correspond to a 26-RU, a 52-RU, a 106-RU, a 242-RU, a 484-RU and/or a 996-RU. The 26-RU is an RU including 26 subcarriers, the 52-RU is an RU including 52 subcarriers, and the 106-RU is an RU including 106 subcarriers.

First, the first wireless STA receives a feedback request field, including a long training field (LTF) from the second wireless STA. The feedback request field including the LTF may correspond to a null data packet (NDP).

The first wireless STA configures feedback information about a wireless channel corresponding to a predetermined frequency band using the feedback request field.

The first wireless STA transmits the feedback information to the second wireless STA.

The feedback information includes channel status information about a predetermined subcarrier index. The predetermined subcarrier index may correspond to a feedback subcarrier index. Furthermore, the predetermined subcarrier index is determined depending on the predetermined number of subcarrier groupings. That is, the channel status information is indicative of a feedback subcarrier for each subcarrier group. In other words, the channel status information indicates where a feedback subcarrier is allocated within a frequency band.

The subcarrier group is generated based on grouping information in subcarriers other than a guard subcarrier and a DC subcarrier within a frequency band. That is, the predetermined subcarrier index may be determined depending on the predetermined number of subcarrier groupings other than a guard subcarrier and a DC subcarrier.

For example, if the predetermined frequency band is 20 MHz and the predetermined number of subcarrier groupings is set to 4, the predetermined subcarrier index may be set as {−120, −118 or −114, −112, −108, −104, −100, −96} in a first 26-RU, may be set as {−94, −92 or −88, −86, −82, −78, −74, −70} in a second 26-RU, may be set as {−68, −64, −60, −56, −52, −50 or −46, −44} in a third 26-RU, may be set as {−42, −38, −34, −30, −26, −24 or −20, −18} in a fourth 26-RU, may be set as {−16, −12, −8, −4, 4, 8, 12, 16} in a fifth 26-RU, may be set as {42, 38, 34, 30, 26, 24 or 20, 18} in a sixth 26-RU, may be set as {68, 64, 60, 56, 52, 50 or 46, 44} in a seventh 26-RU, may be set as {94, 92 or 88, 86, 82, 78, 74, 70} in an eighth 26-RU, and may be set as {120, 118 or 114, 112, 108, 104, 100, 96} in a ninth 26-RU.

The predetermined subcarrier index may be set as {−120, −118 or −114, −112, −108, −104, −100, −96, −92, −88, −84, −80, −78 or −74, −72, −70} in a first 52-RU, may be set as {−68, −64, −60, −56, −52, −50 or −46, −44, −40, −38 or −34, −32, −28, −24, −20, −18} or {−68, −66, −64 or −60, −58, −54, −50, −46, −42, −38, −34, −30, −26, −24 or −20, −18} in a second 52-RU, may be set as {68, 64, 60, 56, 52, 50 or 46, 44, 40, 38 or 34, 32, 28, 24, 20, 18} or {68, 66, 64 or 60, 58, 54, 50, 46, 42, 38, 34, 30, 26, 24 or 20, 18} in a third 52-RU, and may be set as {120, 118 or 114, 112, 108, 104, 100, 96, 92, 88, 84, 80, 78 or 74, 72, 70} in a fourth 52-RU.

Furthermore, the predetermined subcarrier index may be set as {−122, −118, −114, −110, −106, −102, −98, −94, −92 or −88, −86, −82, −78, −74, −70, −66, −62, −58, −54, −50, −46, −42, −38, −34, −30, −26, −24 or −20, −18} in a first 106-RU and may be set as {122, 118, 114, 110, 106, 102, 98, 94, 92 or 88, 86, 82, 78, 74, 70, 66, 62, 58, 54, 50, 46, 42, 38, 34, 30, 26, 24 or 20, 18} in a second 106-RU.

For another example, if the predetermined frequency band is 20 MHz and the predetermined number of subcarrier groupings is set to 8, the predetermined subcarrier index may be set as {−120, −112, −104, −96} in a first 26-RU, may be set as {−94, −86, −78, −70} in a second 26-RU, may be set as {−68, −60, −52, −44} in a third 26-RU, may be set as {−42, −34, −26, −18} in a fourth 26-RU, may be set as {−16, −8, −4, 4, 8, 16} or {−16, −12, −4, 4, 12, 16} in a fifth 26-RU, may be set as {42, 34, 26, 18} in a sixth 26-RU, may be set as {68, 60, 52, 44} in a seventh 26-RU, may be set as {94, 86, 78, 70} in an eighth 26-RU, and may be set as {120, 112, 104, 96} in a ninth 26-RU.

The predetermined subcarrier index may be set as {−120, −112, −104, −96, −88, −80, −72, −70} or {−120, −118, −110, −104 or −100, −94, −86, −78, −70} in a first 52-RU, may be set as {−68, −60, −52, −44, −38 or −34, −28, −20, −18} or {−68, −66, −58, −50, −42, −34, −26, −18} in a second 52-RU, may be set as {68, 60, 52, 44, 38 or 34, 28, 20, 18} or {68, 66, 58, 50, 42, 34, 26, 18} in a third 52-RU, and may be set as {120, 112, 104, 96, 88, 80, 72, 70} or {120, 118, 110, 104 or 100, 94, 86, 78, 70} in a fourth 52-RU.

Furthermore, the predetermined subcarrier index may be set as {−122, −114, −106, −98, −92 or −88, −82, −74, −66, −58, −50, −42, −34, −26, −18} in a first 106-RU and may be set as {122, 114, 106, 98, 92 or 88, 82, 74, 66, 58, 50, 42, 34, 26, 18} in a second 106-RU.

For yet another example, if the predetermined frequency band is 20 MHz and the predetermined number of subcarrier groupings is set to 16, the predetermined subcarrier index may be set as {−120, −104, −96} or {−120, −112, −96} in a first 26-RU, may be set as {−94, −78, −70} or {−94, −86, −70} in a second 26-RU, may be set as {−68, −52, −44} or {−68, −60, −44} in a third 26-RU, may be set as {−42, −26, −18} or {−42, −34, −18} in a fourth 26-RU, may be set as {−16, −4, 4, 16} in a fifth 26-RU, may be set as {42, 26, 18} or {42, 34, 18} in a sixth 26-RU, may be set as {68, 52, 44} or {68, 60, 44} in a seventh 26-RU, may be set as {94, 78, 70} or {94, 86, 70} in an eighth 26-RU, and may be set as {120, 104, 96} or {120, 112, 96} in a ninth 26-RU.

The predetermined subcarrier index may be set as {−120, −104, −88, −72, −70} or {−120, −118, −104 or −100, −86, −70} in a first 52-RU, may be set as {−68, −52, −38 or −34, −20, −18} or {−68, −66, −50, −34, −18} in a second 52-RU, may be set as {68, 52, 38 or 34, 20, 18} or {68, 66, 50, 34, 18} in a third 52-RU, and may be set as {120, 104, 88, 72, 70} or {120, 118, 104 or 100, 86, 70} in a fourth 52-RU.

Furthermore, the predetermined subcarrier index may be set as {−122, −106, −92 or −88, −74, −58, −42, −26, −18} or {−122, −114, −98, −82, −66, −50, −34, −18} in a first 106-RU and may be set as {122, 106, 92 or 88, 74, 58, 42, 26, 18} or {122, 114, 98, 82, 66, 50, 34, 18} in a second 106-RU.

The predetermined subcarrier index is not limited to the aforementioned examples and may be set in various manners according to embodiments. The WLAN system supports a plurality of frequency resource units corresponding to different frequency bands. Thus, the predetermined frequency band may be 40 MHz or 80 MHz, and the predetermined subcarrier index may be set in each RU by configuring all of RUs which may be combined within the predetermined frequency band.

If the predetermined subcarrier index overlaps a pilot subcarrier index, the overlapped subcarrier index may be set again as a neighboring subcarrier index at which an LTF coefficient is located. That is, if a feedback subcarrier and a pilot subcarrier overlap, a feedback subcarrier may be set as another neighboring subcarrier index. In this case, the number of samples used to form a Q matrix may be increased in a transmission stage (or a beamformer).

If the predetermined subcarrier index overlaps a null subcarrier index, the overlapped subcarrier index may be set again as a neighboring subcarrier index at which an LTF coefficient is located. That is, if a feedback subcarrier and a null subcarrier (or a leftover tone) overlap, another neighbor subcarrier may be added and fed back. More specifically, in a resource unit (RU) having a small size, it is necessary to additionally feed a signal back in a neighboring subcarrier because the signal is not transferred in a null subcarrier.

Furthermore, the channel status information includes average channel information estimated in a subcarrier other than the null subcarrier and the pilot subcarrier within the subcarrier group or channel information estimated in the feedback subcarrier. That is, the former can help performance due to a smoothing effect obtained because an average channel information value is fed back in all of subcarriers (in this case, except a null subcarrier and a pilot subcarrier) within a subcarrier group. The latter has an advantage in that overhead attributable a computational load can be reduced because only channel information estimated in a feedback subcarrier is fed back and thus it is not necessary to obtain an average channel information value of all of subcarriers. The channel status information is transmitted through the feedback subcarrier.

Furthermore, the feedback request field further includes a legacy-long training field (L-LFT). The size of inverse fast Fourier transform (IFFT) applied to the LTF may be one times or twice the size of IFFT applied to the L-LTF. That is, the aforementioned method may use an NDP to which a 1×-LTF or a 2×-LTF has been applied in order to perform a sounding procedure.

Furthermore, this specification proposes an apparatus for transmitting a feedback frame in a WLAN system. The apparatus may correspond to an STA, a beamformee, etc., but is not limited thereto.

Furthermore, there is proposed a first wireless STA performing communication in a WLAN system supporting a plurality of frequency resource units corresponding to different frequency bands.

First, terms are defined below. The first wireless STA may correspond to a beamformee or an STA, and a second wireless STA may correspond to a beamformer or an AP. The different frequency bands may correspond to 20 MHz, 40 MHz, 80 MHz, etc. The plurality of frequency resource units corresponding to the different frequency bands may correspond to a 26-RU, a 52-RU, a 106-RU, a 242-RU, a 484-RU and/or a 996-RU. The 26-RU is an RU including 26 subcarriers, the 52-RU is an RU including 52 subcarriers, and the 106-RU is an RU including 106 subcarriers.

The apparatus includes a radio frequency (RF) unit transmitting and receiving a radio signal and a process operatively connected to the RF unit.

First, the processor receives a feedback request field, including a long training field (LTF) from the second wireless STA. The feedback request field including the LTF may correspond to a null data packet (NDP).

The processor configures feedback information about a wireless channel corresponding to a predetermined frequency band using the feedback request field.

The processor transmits the feedback information to the second wireless STA.

The feedback information includes channel status information about a predetermined subcarrier index. The predetermined subcarrier index may correspond to a feedback subcarrier index. Furthermore, the predetermined subcarrier index is determined depending on the predetermined number of subcarrier groupings. That is, the channel status information is indicative of a feedback subcarrier for each subcarrier group. In other words, the channel status information indicates where a feedback subcarrier is allocated within a frequency band.

The subcarrier group is generated based on grouping information in subcarriers other than a guard subcarrier and a DC subcarrier within a frequency band. That is, the predetermined subcarrier index may be determined depending on the predetermined number of subcarrier groupings other than a guard subcarrier and a DC subcarrier.

For example, if the predetermined frequency band is 20 MHz and the predetermined number of subcarrier groupings is set to 4, the predetermined subcarrier index may be set as {−120, −118 or −114, −112, −108, −104, −100, −96} in a first 26-RU, may be set as {−94, −92 or −88, −86, −82, −78, −74, −70} in a second 26-RU, may be set as {−68, −64, −60, −56, −52, −50 or −46, −44} in a third 26-RU, may be set as {−42, −38, −34, −30, −26, −24 or −20, −18} in a fourth 26-RU, may be set as {−16, −12, −8, −4, 4, 8, 12, 16} in a fifth 26-RU, may be set as {42, 38, 34, 30, 26, 24 or 20, 18} in a sixth 26-RU, may be set as {68, 64, 60, 56, 52, 50 or 46, 44} in a seventh 26-RU, may be set as {94, 92 or 88, 86, 82, 78, 74, 70} in an eighth 26-RU, and may be set as {120, 118 or 114, 112, 108, 104, 100, 96} in a ninth 26-RU.

The predetermined subcarrier index may be set as {−120, −118 or −114, −112, −108, −104, −100, −96, −92, −88, −84, −80, −78 or −74, −72, −70} in a first 52-RU, may be set as {−68, −64, −60, −56, −52, −50 or −46, −44, −40, −38 or −34, −32, −28, −24, −20, −18} or {−68, −66, −64 or −60, −58, −54, −50, −46, −42, −38, −34, −30, −26, −24 or −20, −18} in a second 52-RU, may be set as {68, 64, 60, 56, 52, 50 or 46, 44, 40, 38 or 34, 32, 28, 24, 20, 18} or {68, 66, 64 or 60, 58, 54, 50, 46, 42, 38, 34, 30, 26, 24 or 20, 18} in a third 52-RU, and may be set as {120, 118 or 114, 112, 108, 104, 100, 96, 92, 88, 84, 80, 78 or 74, 72, 70} in a fourth 52-RU.

Furthermore, the predetermined subcarrier index may be set as {−122, −118, −114, −110, −106, −102, −98, −94, −92 or −88, −86, −82, −78, −74, −70, −66, −62, −58, −54, −50, −46, −42, −38, −34, −30, −26, −24 or −20, −18} in a first 106-RU and may be set as {122, 118, 114, 110, 106, 102, 98, 94, 92 or 88, 86, 82, 78, 74, 70, 66, 62, 58, 54, 50, 46, 42, 38, 34, 30, 26, 24 or 20, 18} in a second 106-RU.

For another example, if the predetermined frequency band is 20 MHz and the predetermined number of subcarrier groupings is set to 8, the predetermined subcarrier index may be set as {−120, −112, −104, −96} in a first 26-RU, may be set as {−94, −86, −78, −70} in a second 26-RU, may be set as {−68, −60, −52, −44} in a third 26-RU, may be set as {−42, −34, −26, −18} in a fourth 26-RU, may be set as {−16, −8, −4, 4, 8, 16} or {−16, −12, −4, 4, 12, 16} in a fifth 26-RU, may be set as {42, 34, 26, 18} in a sixth 26-RU, may be set as {68, 60, 52, 44} in a seventh 26-RU, may be set as {94, 86, 78, 70} in an eighth 26-RU, and may be set as {120, 112, 104, 96} in a ninth 26-RU.

The predetermined subcarrier index may be set as {−120, −112, −104, −96, −88, −80, −72, −70} or {−120, −118, −110, −104 or −100, −94, −86, −78, −70} in a first 52-RU, may be set as {−68, −60, −52, −44, −38 or −34, −28, −20, −18} or {−68, −66, −58, −50, −42, −34, −26, −18} in a second 52-RU, may be set as {68, 60, 52, 44, 38 or 34, 28, 20, 18} or {68, 66, 58, 50, 42, 34, 26, 18} in a third 52-RU, and may be set as {120, 112, 104, 96, 88, 80, 72, 70} or {120, 118, 110, 104 or 100, 94, 86, 78, 70} in a fourth 52-RU.

Furthermore, the predetermined subcarrier index may be set as {−122, −114, −106, −98, −92 or −88, −82, −74, −66, −58, −50, −42, −34, −26, −18} in a first 106-RU and may be set as {122, 114, 106, 98, 92 or 88, 82, 74, 66, 58, 50, 42, 34, 26, 18} in a second 106-RU.

For yet another example, if the predetermined frequency band is 20 MHz and the predetermined number of subcarrier groupings is set to 16, the predetermined subcarrier index may be set as {−120, −104, −96} or {−120, −112, −96} in a first 26-RU, may be set as {−94, −78, −70} or {−94, −86, −70} in a second 26-RU, may be set as {−68, −52, −44} or {−68, −60, −44} in a third 26-RU, may be set as {−42, −26, −18} or {−42, −34, −18} in a fourth 26-RU, may be set as {−16, −4, 4, 16} in a fifth 26-RU, may be set as {42, 26, 18} or {42, 34, 18} in a sixth 26-RU, may be set as {68, 52, 44} or {68, 60, 44} in a seventh 26-RU, may be set as {94, 78, 70} or {94, 86, 70} in an eighth 26-RU, and may be set as {120, 104, 96} or {120, 112, 96} in a ninth 26-RU.

The predetermined subcarrier index may be set as {−120, −104, −88, −72, −70} or {−120, −118, −104 or −100, −86, −70} in a first 52-RU, may be set as {−68, −52, −38 or −34, −20, −18} or {−68, −66, −50, −34, −18} in a second 52-RU, may be set as {68, 52, 38 or 34, 20, 18} or {68, 66, 50, 34, 18} in a third 52-RU, and may be set as {120, 104, 88, 72, 70} or {120, 118, 104 or 100, 86, 70} in a fourth 52-RU.

Furthermore, the predetermined subcarrier index may be set as {−122, −106, −92 or −88, −74, −58, −42, −26, −18} or {−122, −114, −98, −82, −66, −50, −34, −18} in a first 106-RU and may be set as {122, 106, 92 or 88, 74, 58, 42, 26, 18} or {122, 114, 98, 82, 66, 50, 34, 18} in a second 106-RU.

The predetermined subcarrier index is not limited to the aforementioned examples and may be set in various manners according to embodiments. The WLAN system supports a plurality of frequency resource units corresponding to different frequency bands. Thus, the predetermined frequency band may be 40 MHz or 80 MHz, and the predetermined subcarrier index may be set in each RU by configuring all of RUs which may be combined within the predetermined frequency band.

If the predetermined subcarrier index overlaps a pilot subcarrier index, the overlapped subcarrier index may be set again as a neighboring subcarrier index at which an LTF coefficient is located. That is, if a feedback subcarrier and a pilot subcarrier overlap, a feedback subcarrier may be set as another neighboring subcarrier index. In this case, the number of samples used to form a Q matrix may be increased in a transmission stage (or a beamformer).

If the predetermined subcarrier index overlaps a null subcarrier index, the overlapped subcarrier index may be set again as a neighboring subcarrier index at which an LTF coefficient is located. That is, if a feedback subcarrier and a null subcarrier (or a leftover tone) overlap, another neighbor subcarrier may be added and fed back. More specifically, in a resource unit (RU) having a small size, it is necessary to additionally feed a signal back in a neighboring subcarrier because the signal is not transferred in a null subcarrier.

Furthermore, the channel status information includes average channel information estimated in a subcarrier other than the null subcarrier and the pilot subcarrier within the subcarrier group or channel information estimated in the feedback subcarrier. That is, the former can help performance due to a smoothing effect obtained because an average channel information value is fed back in all of subcarriers (in this case, except a null subcarrier and a pilot subcarrier) within a subcarrier group. The latter has an advantage in that overhead attributable a computational load can be reduced because only channel information estimated in a feedback subcarrier is fed back and thus it is not necessary to obtain an average channel information value of all of subcarriers. The channel status information is transmitted through the feedback subcarrier.

Furthermore, the feedback request field further includes a legacy-long training field (L-LFT). The size of inverse fast Fourier transform (IFFT) applied to the LTF may be one times or twice the size of IFFT applied to the L-LTF. That is, the aforementioned method may use an NDP to which a 1×-LTF or a 2×-LTF has been applied in order to perform a sounding procedure.

If the method proposed by this specification is used, a beamforming feedback tone index more suitable for an OFDMA system can be efficiently configured by taking into consideration a relation between pilot tones for each RU in the 802.11ax system, and feedback overhead can be reduced when a beamformee transmits a feedback frame.

DESCRIPTION OF EXEMPLARY EMBODIMENTS

Figure 1:
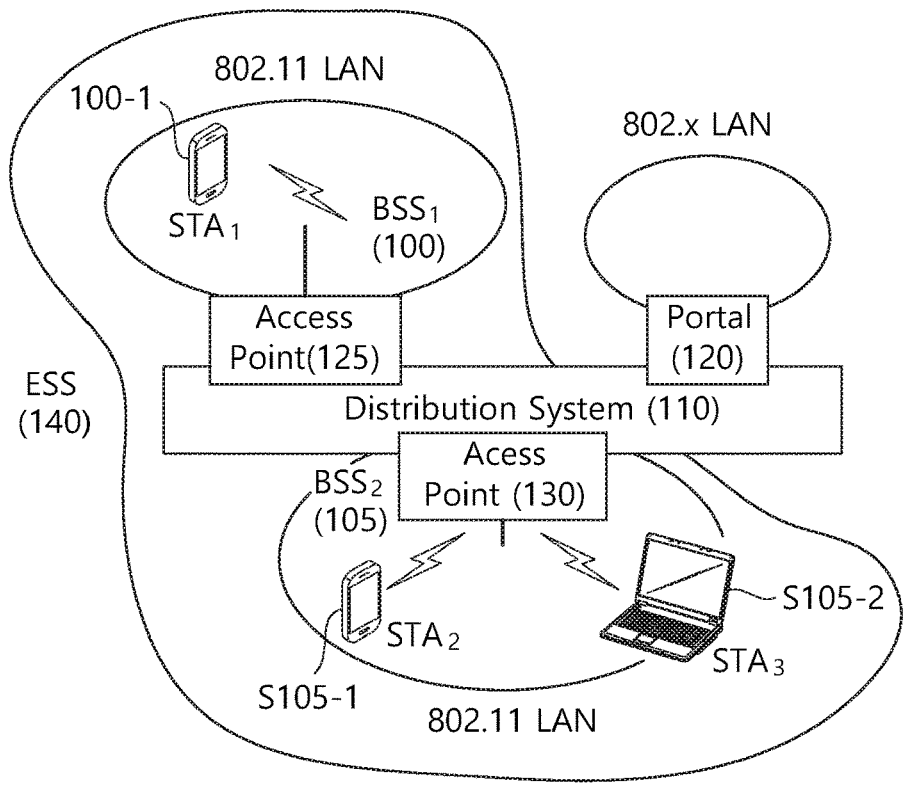
FIG. 1 is a conceptual view illustrating the structure of a wireless local area network (WLAN).
Figure 1:
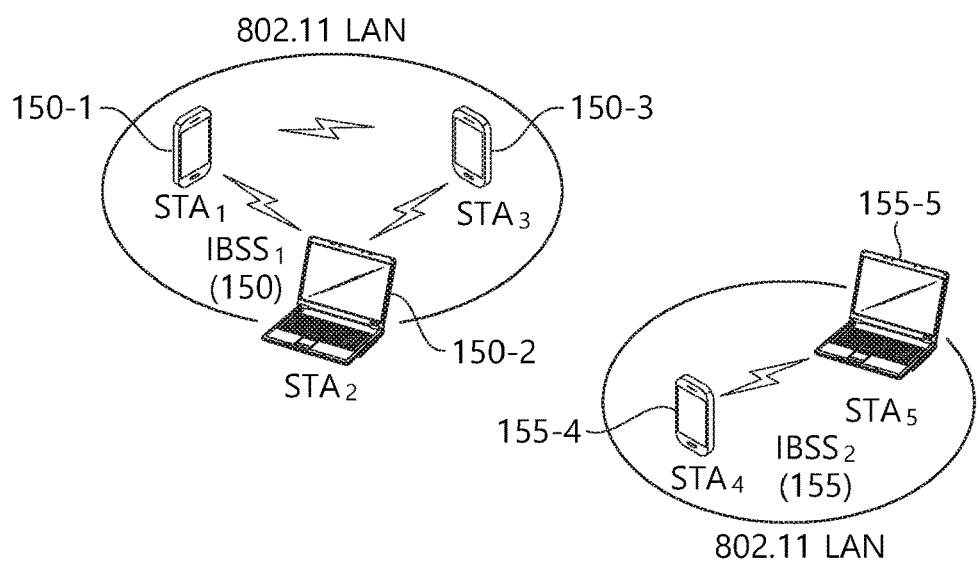

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region. The BSS 105 may include one or more STAs 105-1 and 105-2 which may be joined to one AP 130.

The BSS may include at least one STA, APs providing a distribution service, and a distribution system (DS) 110 connecting multiple APs.

The distribution system 110 may implement an extended service set (ESS) 140 extended by connecting the multiple BSSs 100 and 105. The ESS 140 may be used as a term indicating one network configured by connecting one or more APs 125 or 230 through the distribution system 110. The AP included in one ESS 140 may have the same service set identification (SSID).

A portal 120 may serve as a bridge which connects the wireless LAN network (IEEE 802.11) and another network (e.g., 802.X).

In the BSS illustrated in the upper part of FIG. 1, a network between the APs 125 and 130 and a network between the APs 125 and 130 and the STAs 100-1, 105-1, and 105-2 may be implemented. However, the network is configured even between the STAs without the APs 125 and 130 to perform communication. A network in which the communication is performed by configuring the network even between the STAs without the APs 125 and 130 is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs 150-1, 150-2, 150-3, 155-4, and 155-5 are managed by a distributed manner. In the IBSS, all STAs 150-1, 150-2, 150-3, 155-4, and 155-5 may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Meanwhile, the term user may be used in diverse meanings, for example, in wireless LAN communication, this term may be used to signify a STA participating in uplink MU MIMO and/or uplink OFDMA transmission. However, the meaning of this term will not be limited only to this.

Figure 2:
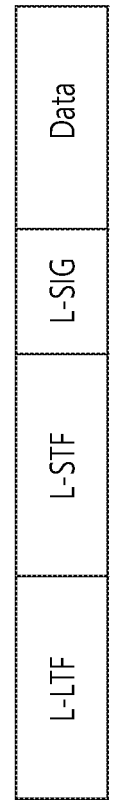
FIG. 2 is a diagram illustrating an example of a PPDU used in an IEEE standard.
Figure 2:
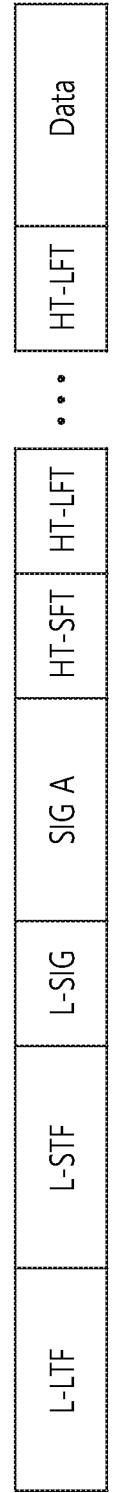
Figure 2:

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
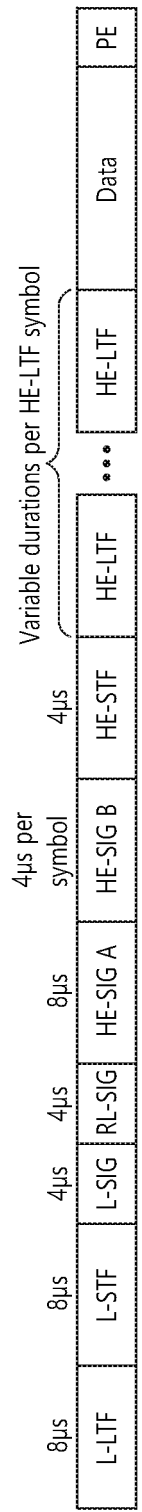
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 µs).

More detailed description of the respective fields of FIG. 3 will be made below.

Figure 4:
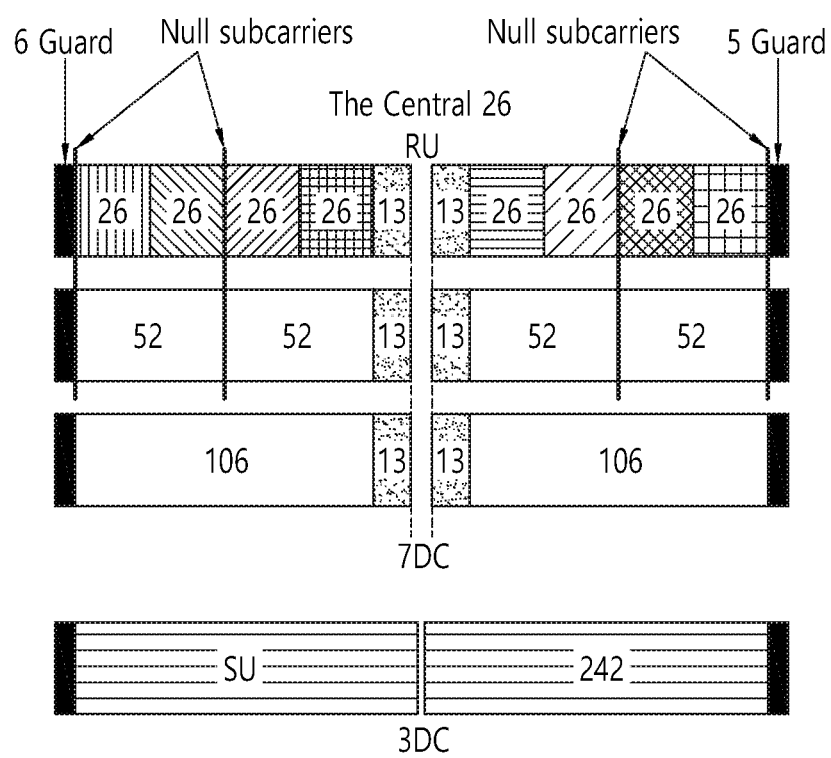
FIG. 4 is a diagram illustrating a layout of resource units (RUs) used in a band of 20 MHz.

FIG. 4 is a diagram illustrating a layout of resource units (RUs) used in a band of 20 MHz.

As illustrated in FIG. 4, resource units (RUs) corresponding to tone (that is, subcarriers) of different numbers are used to constitute some fields of the HE-PPDU. For example, the resources may be allocated by the unit of the RU illustrated with respect to the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and in this case, as illustrated in a lowermost part of FIG. 4, one 242-unit may be used and in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
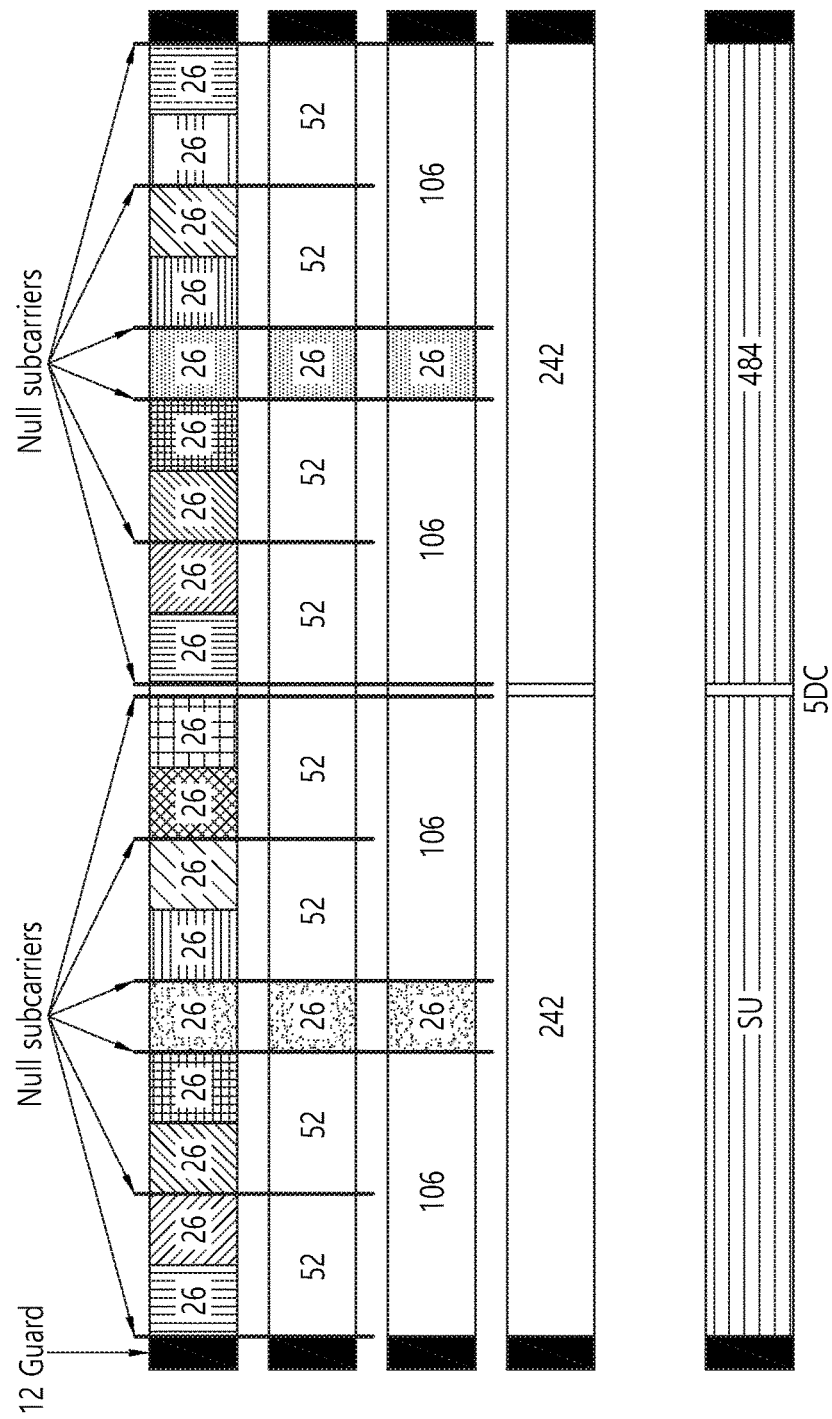
FIG. 5 is a diagram illustrating a layout of resource units (RUs) used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
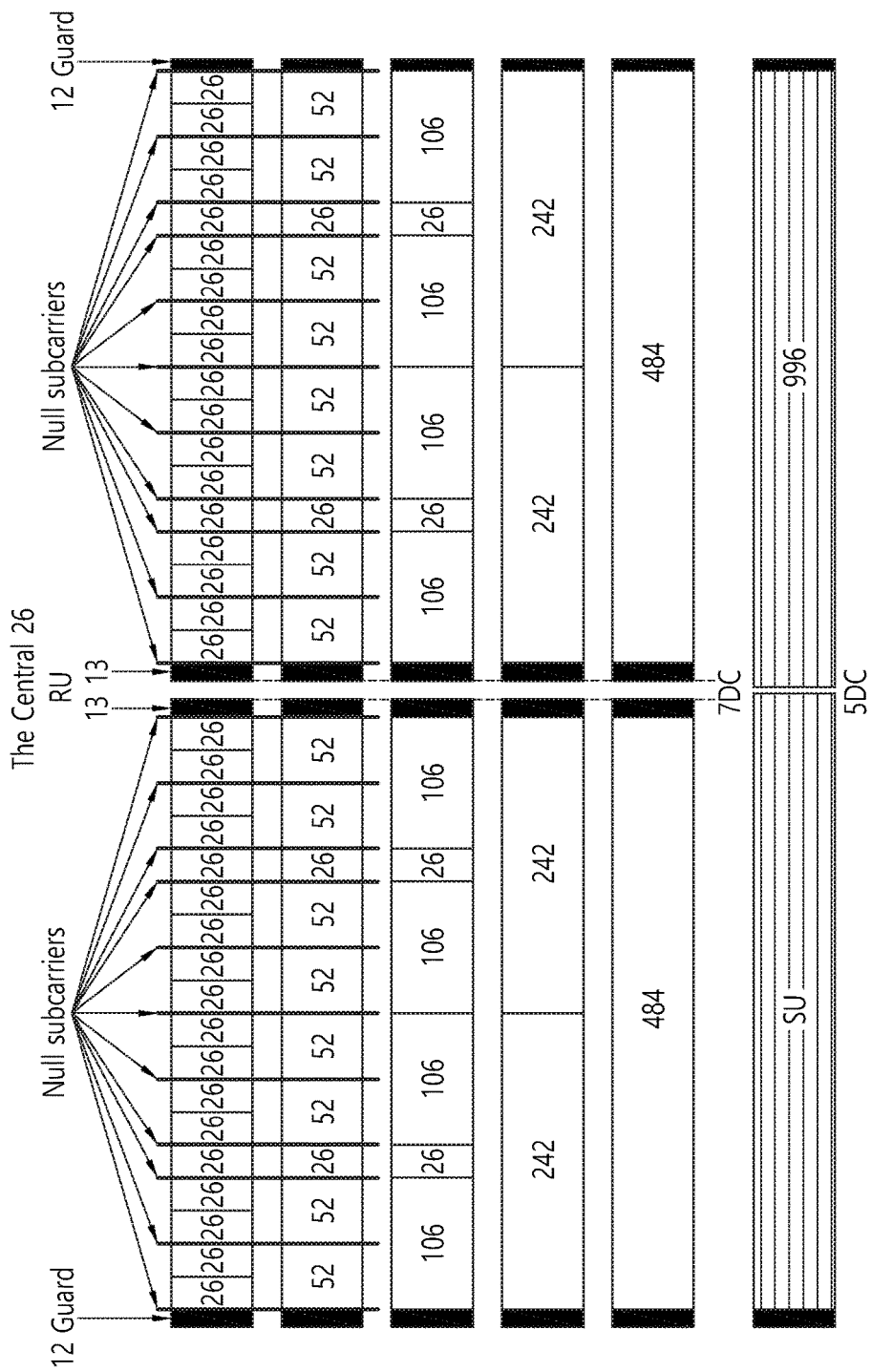
FIG. 6 is a diagram illustrating a layout of resource units (RUs) used in a band of 80 MHz.

FIG. 6 is a diagram illustrating a layout of resource units (RUs) used in a band of 80 MHz.

Similarly to a case in which the RUs having various RUs are used in one example of each of FIG. 4 or 5, 26-RU, 52-RU, 106-RU, 242-RU, 484-RU, and the like may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and in this case, 5 DC tones may be inserted. Meanwhile, the detailed number of RUs may be modified similarly to one example of each of FIG. 4 or 5.

Figure 7:
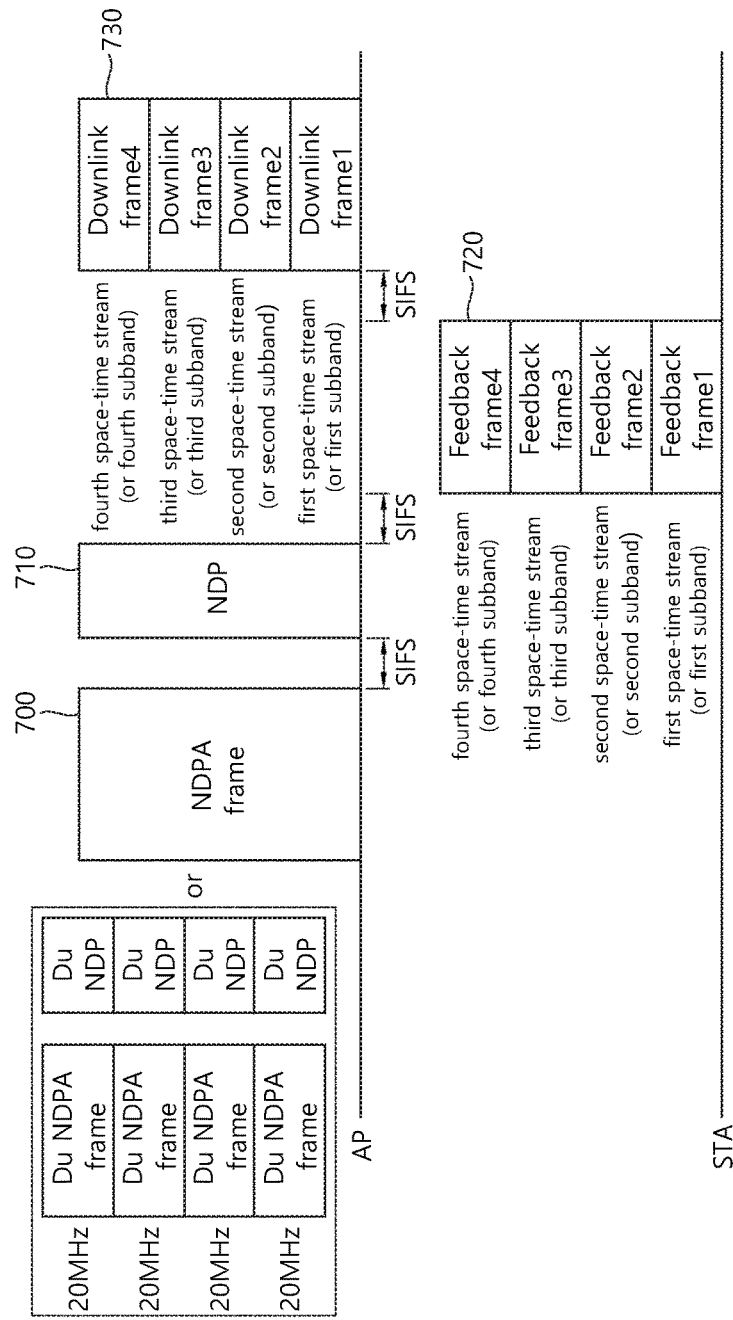
FIG. 7 is a concept view illustrating a method of transmitting a frame on the basis of a sounding procedure according to an embodiment of the present invention.

FIG. 7 is a concept view illustrating a method of transmitting a frame on the basis of a sounding procedure according to an embodiment of the present invention.

Disclosed in FIG. 7 is a method of transmitting a frame on the basis of a sounding procedure for a single STA. The sounding procedure may be a procedure for acquiring channel state information. More specifically, disclosed is a method in which an AP performs the sounding procedure with respect to the STA, and transmits a downlink frame to the STA through SU-MIMO (or OFDMA) or MU-MIMO according to feedback information acquired on the basis of the sounding procedure.

The AP may transmit a null data packet announcement (NDPA) frame 700 to the STA for the sounding procedure, and may transmit an NDP 710 after a specific time (e.g., a short interframe space (SIFS)).

The NDPA frame 700 may be used to report to the STA that the sounding procedure starts and the NDP 710 is transmitted. The NDPA frame 700 may include an STA information field. The STA information field may indicate an STA for receiving the NDP 710 to be transmitted after the NDPA frame 700 and for transmitting a feedback frame. The STA indicated on the basis of the STA information field may estimate a channel on the basis of the NDP 710 and may transmit a feedback frame 720 including the channel state information to the AP. That is, the STA may determine whether to transmit the feedback frame 720 to the AP by participating in channel sounding on the basis of the STA information field included in the received NDPA frame 700.

The NDP 710 may have a format which includes only a PPDU header by omitting a data field from the typical PPDU. The NDP 710 may be precoded by the AP on the basis of a specific precoding matrix. Upon receiving the NDP 710, the STA may estimate a channel on the basis of a training field (e.g., HE-LTF) of the NDP 710 and may acquire channel state information. Since the NDP 710 does not have the data field, length information indicating a PSDU length included in the data field of the NDP 710 or a length of an aggregate-MAC protocol data unit (A-MPDU) included in the PSDU may be set to 0.

Each of the NDPA frame 700 and the NDP 710 may be transmitted through a full bandwidth for transmission of the NDPA frame 700 and the NDP 710. The PPDU format may be expressed by the term 'non-duplicated PPDU format'.

Alternatively, each of the NDPA frame 700 and the NDP 710 may be transmitted through a plurality of channels on the basis of a duplicate PPDU format. The duplicate PPDU format may be transmitted through a bandwidth greater than 20 MHz (e.g., 40 MHz, 80 MHz, 160 MHz, 80 MHz+80 MHz, etc.) by replicating the PPDU format transmitted through an adjacent channel (or a primary channel) (20 MHz). When a duplicate format 450 is used, the same data may be transmitted through each of a plurality of channels (a replication target channel and a replication channel). That is, an NDPA PPDU (or NDP) may be used based on a duplicate format used to carry replicated information through each of a plurality of channels. The NDPA frame 700 and the NDP 710 having the non-duplicate PPDU format or the duplicate PPDU format may be transmitted to at least one STA through at least one space-time stream. If the AP receives a feedback frame from a single STA as shown in FIG. 7, the AP may transmit the NDPA frame 700 and the NDP 710 to the single STA through at least one stream. If the AP receives the feedback frame from the single STA, the NDPA frame 700 may indicate at least one STA for transmitting the feedback frame. An LTF may be transmitted through at least one space-time stream through the NDP 710, and the STA may transmit to the AP a feedback frame including channel state information measured on the basis of the LTF of an indicated space-time stream and an indicated frequency domain.

Alternatively, the NDPA frame 700 and the NDP 710 may be transmitted based on a DL MU transmission method. More specifically, the NDPA frame 700 and the NDP 710 may be transmitted to a plurality of STAs through different space-time streams on the basis of DL MU MIMO transmission, or may be transmitted to the plurality of STAs through different frequency resources (or a subband, a channel) on the basis of DL MU OFDMA. In this case, the NDPA frame 700 and the NDP 710 transmitted through the different space-time streams or the different frequency resources may include different information. That is, the AP may transmit a plurality of NDPA frames respectively to the plurality of STAs, and may transmit a plurality of NDPs respectively to the plurality of STAs. For example, the NDPA frame transmitted through a specific space-time stream or a specific frequency resource may indicate only a specific STA for transmitting a feedback frame.

Hereinafter, an embodiment of the present invention is described for convenience of explanation by assuming a case where an NDPA frame and an NDP are transmitted to at least one STA through at least one stream on the basis of a non-duplicate PPDU format or a duplicate PPDU format.

The STA may perform channel estimation on the basis of the NDP 710, and may transmit acquired channel state information to the AP through the feedback frame 720. A channel bandwidth used for transmission of the feedback frame 720 may be set to be narrower than or equal to a channel bandwidth used for transmission of the NDPA frame 700. The feedback frame 720 may include channel state information (or stream state information) for each of an indicated space-time stream (or spatial stream).

If the NDP 710 is not transmitted based on beamforming, the feedback frame 720 may include a high throughput (HT) control field and a channel information control field (e.g., very high throughput (VHT) MIMO control field or an HE MU control field). The HT control field may include information regarding Nsts (the number of space-time streams), MCS, bandwidth (BW), and SNR. The control information control field may be reserved.

If the NDP 710 is transmitted based on beamforming, the feedback frame 720 may include an HT control field, a channel information control field, and a channel information field. The HT control field may include information regarding Nsts, MCS, BW, and SNR. The channel control field may include information regarding Nc, Nr, Ng, etc., and/or control information for OFDMA-based transmission. The channel information control field may include SNR information per stream, information of a beamforming feedback matrix for each subcarrier, SNR information for each frequency resource (e.g., subband) in OFDMA-based transmission, etc.

A format of the NDPA frame 700, the NDP 710, and the feedback frame 720 is described later in detail.

According to the embodiment of the present invention, upon receiving the NDAP 710, the STA may transmit the feedback frame 720 to the AP after a specific time (e.g., SIFS). The AP may receive the feedback frame 720, and after the specific time (e.g., SIFS), may transmit a downlink frame 730 to the STA on the basis of SU MIMO (or OFDMA/MU-MIMO). The AP may transmit the downlink frame 730 generated based on channel variation information determined by considering channel state information included in the feedback frame 720.

The STA may transmit an ACK or a block ACK to the AP in response to the received downlink frame 730.

If the downlink frame 730 transmitted by the AP receives the feedback frame 720 and is transmitted after the SIFS, a feedback channel state parameter (e.g., Nsts, MCS, BW, SNR, Nc, Nr, Ng, SNR information per stream, information of a beamforming feedback matrix for each subcarrier, SNR information for each frequency resource (e.g., subband) in OFDMA-based transmission, etc.) is relatively accurate, and thus data transmission efficiency may be increased.

Hereinafter, FIG. 8 to FIG. 10 disclose the NDPA PPDU and NPD 710 for carrying the NDPA frame 700 to perform the sounding procedure and the feedback PPDU for carrying the feedback frame 720 in detail according to an embodiment of the present invention.

Figure 8:
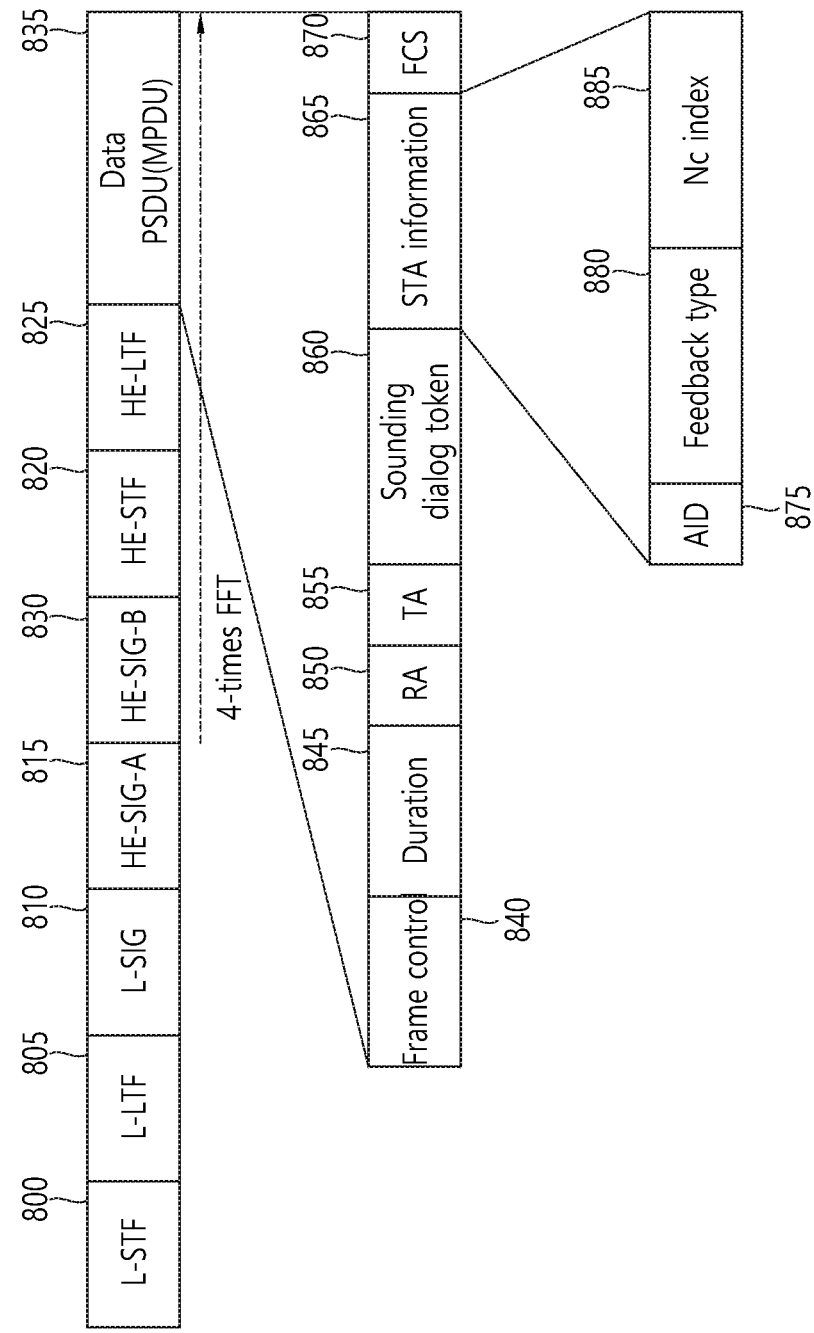
FIG. 8 is a concept view illustrating a format of a null data packet announcement (NDPA) PLCP protocol data unit (PPDU) according to an embodiment of the present invention.

FIG. 8 is a concept view illustrating a format of an NDPA PPDU according to an embodiment of the present invention.

Referring to an upper part of FIG. 8, the NDPA PPDU may include a PPDU header and a PSDU (or MPDU). The PPDU header used herein may include a PHY preamble and a PHY header. A PSDU (or MPDU) of the NPDA PPDU may include an NDPA frame.

The PPDU header of the NDPA PPDU may include a legacy-short training field (L-STF) 800, a legacy-long training field (L-LTF) 805, a legacy-signal (L-SIG) 810, a high efficiency-signal A (HE-SIG A) 815, a high efficiency-signal B (HE-SIG B) 830, a high efficiency-short training field (HE-STF) 820, a high efficiency-long training field (HE- LTF) 825. The PHY header may be divided into a legacy part before the L-SIG 810 and a high efficiency (HE) part after the L-SIG 810.

The L-STF 800 may include a short training orthogonal frequency division multiplexing (OFDM) symbol. The L-STF 800 may be used for frame detection, automatic gain control (AGC), diversity detection, and coarse frequency/time synchronization.

The L-LTF 805 may include a long training OFDM symbol. The L-LTF 805 may be used for fine frequency/time synchronization and channel prediction.

The L-SIG 810 may be used to transmit control information. The L-SIG 810 may include information for a data rate and a data length.

The HE-SIG A 815 may include information indicating an STA for receiving a PPDU. More specifically, the HE-SIG A 815 may include information indicating an STA for receiving an NDPA frame.

In addition, the HE-SIG A 815 may include color bits information for BSS identification information, bandwidth information, a tail bit, a CRC bit, modulation and coding scheme (MCS) information for the HE-SIG B 830, symbol count information for the HE-SIG B 830, and cyclic prefix (CP) (or guard interval (GI)) length information.

The HE-STF 820 may be used to improve automatic gain control estimation in a multiple input multiple output (MIMO) environment or an OFDMA environment.

The HE-LTF 825 may be used to estimate a channel in the MIMO environment or the OFDMA environment.

The HE-SIG B 830 may include a length of physical layer service data unit (PSDU) for each STA, information regarding modulation and coding scheme (MCS), a tail bit, or the like.

A size of inverse fast Fourier transform (IFFT) applied to the HE-STF 820 and a field which comes after the HE-STF 820 may be different from a size of IFFT applied to a field which comes before the HE-STF 820. For example, the size of IFFT applied to the HE-STF 820 and the field which comes after the HE-STF 820 may be four times greater than the size of IFFT applied to the field which comes before the HE-STF 820. The STA may receive the HE-SIG A 815, and may be instructed to receive a downlink PPDU on the basis of the HE-SIG A 815. In this case, the STA may perform decoding on the HE-STF 820 and the field which comes after the HE-STF 820 on the basis of a changed FFT size. On the contrary, if the STA is not instructed to receive the downlink PPDU on the basis of the HE-SIG A 815, the STA may stop decoding and may configure a network allocation vector (NAV). A cyclic prefix (CP) of the HE-STF 820 may have a size greater than a CP of another field, and for this CP duration, the STA may perform decoding on the downlink PPDU by changing the FFT size.

An order of a field constructing the aforementioned NDPA PPDU format may be changed.

For example, an HE-SIG B of an HE part should be located immediately after an HE-SIG A. That is, each field of the HE part may be located in the order of HE-SIG A, HE-SIG B, HE-STF, HE-LTF. The STA may perform decoding on the HE-SIG and up to the HE-SIG B, may receive necessary control information, and may configure an NAV. Likewise, a size of IFFT applied to an HE-STF and a field which comes after the HE-STF may be different from a size of IFFT applied to a field which comes before the HE-STF. The STA may receive the HE-SIG A and the HE-SIG B. If it is instructed to receive the downlink PPDU by the STA identifier field of the HE-SIG A, the STA may perform decoding on the downlink PPDU starting from the HE-STF by changing the FFT size. On the contrary, the STA may receive the HE-SIG A, and if it is not instructed to receive the downlink PPDU on the basis of the HE-SIG A, may configure the NAV.

A PSDU (or MPDU) 835 of the NDPA PPDU may include the NDPA frame. The NDPA frame may include a frame control field 840, a duration field 845, an RA field 850, a TA field 855, a sounding dialog token field 860, an STA information field 865, and an FCS 870.

The frame control field 840 may include a type and subtype for indicating the NDPA frame.

The duration field 845 may include information regarding a duration for protecting transmission of the NDPA frame.

The RA field 850 may include identification information of an STA for receiving the NDPA frame. For example, when the STA information field includes information regarding a single STA, the RA field 850 may include address information of the STA. If the STA information field 865 includes information regarding a plurality of STAs, the RA field 850 may include a broadcast address of the STA. For example, the RA field 850 may include MAC address information of the STA for receiving the NDPA frame.

The TA field 855 may include an address of an AP for transmitting the NDPA frame.

The sounding dialog token field 860 may include information used by the AP for transmitting the NDPA frame to identify the NDPA frame.

The STA information field 865 may include identification information (AID) 875, feedback type information 880, and Nc index information 885 of the STA for receiving the NDPA frame.

Table 1 below discloses information included in the STA information field.

TABLE 1

| Subfield | Description |
| --- | --- |
| AID | AID (assoication identifier) of STA for performing sounding procedure (for receiving NDP to be transmitted later) is included |
| Feedback type | Indicate feedback request type of STA for performing souding procedure<br>Set to '0' in case of SU-MIMO<br>Set to '1' in case of MU-MIMO |
| Nc index | Inidicate requested feedback dimension (information regarding the number of columns of beamforming feedback matrix)<br>In case of MU-MOMO:<br>Set to '0' if Nc = 1<br>Set to '1' if Nc = 2<br>Set to '2' if Nc = 3<br>Set to '3' if Nc = 4<br>Set to '4' if Nc = 5<br>Set to '5' if Nc = 6<br>Set to '6' if Nc = 7<br>Set to '7' if Nc = 8<br>In case of SU-MIMO, reserved subfield (Set to 0) |

In Table 1, Nc may indicate the number of columns of beamforming feedback matrices included in a feedback frame transmitted in response to an NDP.

Upon receiving an NDPA frame, STAs may confirm an AID sub-field value included in an STA information field, and may confirm whether it is a sounding target STA.

FIG. 8 is one example for an NDPA PPDU. The NDPA PPDU may have the legacy PPDU format (e.g., an HT PPDU format, a VHT PPDU format) instead of the HE-SIG A 815, the HE-STF 820, the HE-LTF 825, and the HE-SIG B 830.

Figure 9:
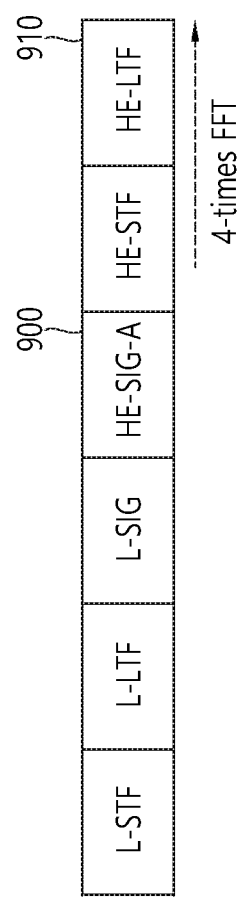
FIG. 9 is a concept view illustrating a null data packet (NDP) according to an embodiment of the present invention.

FIG. 9 is a concept view illustrating an NDP according to an embodiment of the present invention.

Referring to FIG. 9, the NDP may include only a PPDU header except for a PSDU (or MPDU).

As described above, the NDP (or PPDU header) may include a legacy part and a non-legacy part. Each field included in the legacy part and the non-legacy part may perform a role described above in FIG. 8 for transmission of the NDP.

For example, an HE-SIG A 900 may include information indicating an STA for receiving the NDP.

An HE-LTF 910 may be used for channel estimation of the STA. That is, the STA may perform channel estimation on the basis of the HE-LTF 910 included in the NDP frame, and may generate a feedback frame on the basis of a result of the channel estimation.

An HE-SIG B 920 may include information which indicates a PSDU length of 0.

As described above in FIG. 8, an order of some fields included in the aforementioned NDP may be changed. That is, each field of the PPDU header may be located in the order of HE-SIG A, HE-STF, and HE-LTF.

Figure 10:
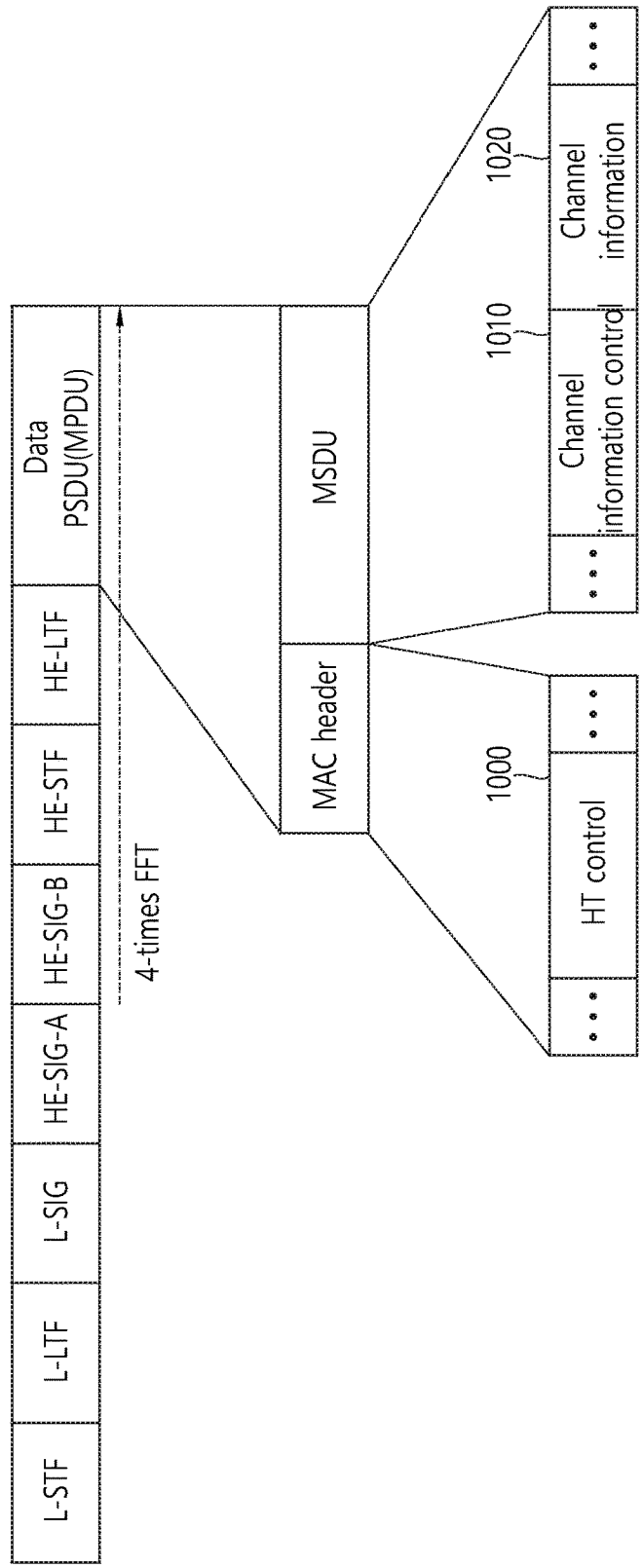
FIG. 10 is a concept view illustrating a feedback PPDU according to an embodiment of the present invention.

FIG. 10 is a concept view illustrating a feedback PPDU according to an embodiment of the present invention.

Referring to FIG. 10, the feedback PPDU may include a PPDU header and a PSDU (or MPDU). The PSDU (or MPDU) of the feedback PPDU may include a feedback frame.

The PPDU header of the feedback PPDU may include a legacy part and a non-legacy part. Each field included in the legacy part and the non-legacy part may perform a role described above in FIG. 8 for the feedback PPDU.

A MAC header of the feedback frame may include an HT control field 1000, and the MSDU may include a channel information control field 1010 and a channel information field 1020. If beamforming is not used in the sounding procedure as described above, the channel information control field 1010 and the channel information field 1020 may not be included in the feedback frame or may be reserved, and the feedback frame may include only the HT control field 1000. Only when the beamforming is used in the sounding procedure, the feedback frame may include the channel information control field 1010 and the channel information field 1020.

The HT control field 1010 may include an MCS feedback (MFB) field. The MFB field may include information N_STS regarding the number of recommended space-time streams, information MCS regarding a recommended MCS index, information BW regarding a bandwidth size intended by a recommended MCS, and information regarding an average SNR measured on all space-time streams and subcarriers for transmitting data.

Table 2 and Table 3 show a format of the channel information control field 1010 and the channel information field 1020.

Table 2 below discloses information included in the channel information control field 1010.

TABLE 2

| Subfield | Description |
| --- | --- |
| Nc index | Inidicate a value obtained by subtracting 1 from the number Nc of columns of a beamforming feedback matrix<br>Set to 0 if Nc = 1<br>Set to 1 if Nc = 2<br>. . . |

TABLE 2-continued

| Subfield | Description |
| --- | --- |
| | Set to 7 if Nc = 8 |
| Nr index | Inidicate a value obtained by subtracting 1 from the number Nrc of rows of a beamforming feedback matrix<br>Set to 0 if Nc = 1<br>Set to 1 if Nc = 2<br>. . .<br>Set to 7 if Nc = 8 |
| Channel bandwidth | Indicate a size of a channel bandwidth measured for generation of a beamforming feedback matrix<br>Set to 0 if 20 MHz<br>Set to 1 if 40 MHz<br>Set to 2 if 80 MHz<br>Set to 3 if 160 MHz or 80 + 80 MHz |
| Grouping, Ng | Inidicate subcarrier grouping used for a beamforming feedback matrix<br>Set to 0 if Ng = 1 (no grouping)<br>Set to 1 if Ng = 2<br>Set to 2 if Ng = 4<br>(3 is reserved) |
| Codebook information | Inidicate a size of codebook entries |
| Feedback type | Inidicate whether it is beamforming feedback for SU-MIMO or beamforming feedback for MU-MIMO |
| Sounduing sequence | Sequency number from NDPA for requesting feedback |

Table 3 below describes information included in the channel information field 1020.

TABLE 3

| Subfield | Description |
| --- | --- |
| SNR(signal to noise ratio) of spatial stream 1 | Average SNR on subcarriers in recipient for spatial stream 1 |
| . . . | . . . |
| SNR of spatial stream Nc | Average SNR on subcarriers in recipient for spatial stream Nc |
| Beamforming feedback matrix (subcarrier index 0) | Order of angles for determining beamforming feedback matrix for corresponding subcarrier |
| Beamforming feedback matrix (subcarrier index 1) | Order of angles of beamforming feedback matrix for corresponding subcarrier |
| . . . | . . . |
| Beamforming feedback matrix (subcarrier index Ns) | Order of angles of beamforming feedback matrix for corresponding subcarrier |
| SNR(signal to noise ratio) of subband 1 | Average SNR on subcarrier included in subband 1 in recipient |
| . . . | . . . |
| SNR of subband Nk | Average SNR on subcarrier included in subband Nk in recipient |

Information of the channel information field 1020 disclosed in Table 3 may be interpreted on the basis of information included in the channel control field 1010 disclosed in Table 2. For example, the AP may receive a feedback frame, and a subcarrier index Ns may be determined on the basis of channel bandwidth information and grouping information of the channel information control field 1010.

According to another embodiment of the present invention, in the grouping field Ng, a reserved 3(0x11) may be used for a subband-unit feedback. If the grouping field Ng is 3, it may indicate the subband-unit feedback. If Ng=3, an SNR or a beamforming feedback matrix (or a matrix vector) may be fed back in a subband unit. For example, a subband unit for a feedback may be fixed in unit of 26 tones or may be set to an additional unit (e.g., a tone corresponding to a multiple unit of 26 tones) on the basis of an additional subband related field.

In addition, an SNR or a beamforming feedback matrix (or a matrix vector) for a full frequency band may be transmitted through a feedback PPDU irrespective of whether grouping is achieved.

In addition, an Nc index count may be defined as not being singular (e.g., Nc) but being plural (e.g., Nc1, Nc2, etc.), and thus a plurality of pieces of feedback information corresponding to the plurality of Nc may be included in the feedback frame.

In the wireless LAN system to which the embodiment of the present description is applied, the whole bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, sub channels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, sub channel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, when the uplink transmission by the plurality of respective STAs (e.g., non-AP STAs) is performed on the frequency domain, the AP may allocate the different frequency resources to the plurality of respective STAs as the uplink transmission resources based on the OFDMA. Further, as described above, the different frequency resources may be different subbands (alternatively, sub channels) or different resources units (RUs).

The different frequency resources are indicated through a trigger frame with respect to the plurality of respective STAs.

Figure 11:
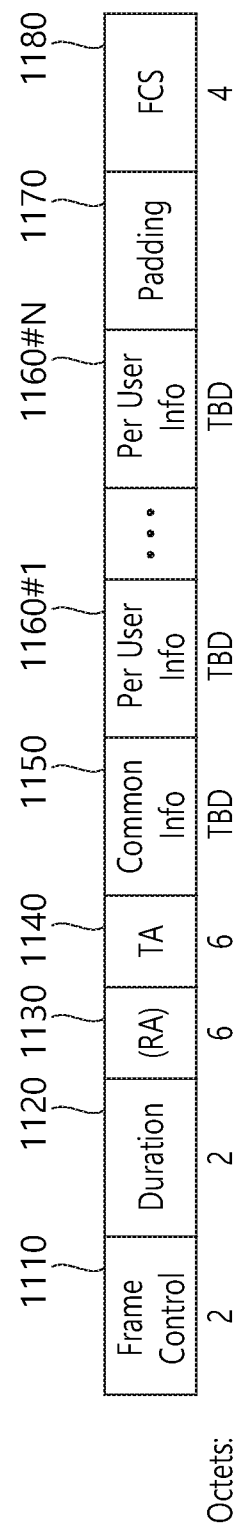
FIG. 11 illustrates an example of a trigger frame.

FIG. 11 illustrates an example of a trigger frame. The trigger frame of FIG. 11 allocates resources for Uplink Multiple-User (MU) transmission and may be transmitted from the AP. The trigger frame may be configured as a MAC frame and may be included in the PPDU. For example, the trigger frame may be transmitted through the PPDU shown in FIG. 3, through the legacy PPDU shown in FIG. 2, or through a certain PPDU, which is newly designed for the corresponding trigger frame. In case the trigger frame is transmitted through the PPDU of FIG. 3, the trigger frame may be included in the data field shown in the drawing.

Each of the fields shown in FIG. 11 may be partially omitted, or other fields may be added. Moreover, the length of each field may be varied differently as shown in the drawing.

A Frame Control field 1110 shown in FIG. 11 may include information related to a version of the MAC protocol and other additional control information, and a Duration field 1120 may include time information for configuring a NAV or information related to an identifier (e.g., AID) of the user equipment.

Additionally, a RA field 1130 may include address information of a receiving STA of the corresponding trigger frame, and this field may also be omitted as required. A TA field 1140 may include address information of the STA (e.g., AP) transmitting the corresponding trigger frame, and a common information field 1150 may include common control information that is applied to the receiving STA receiving the corresponding trigger frame.

Figure 12:
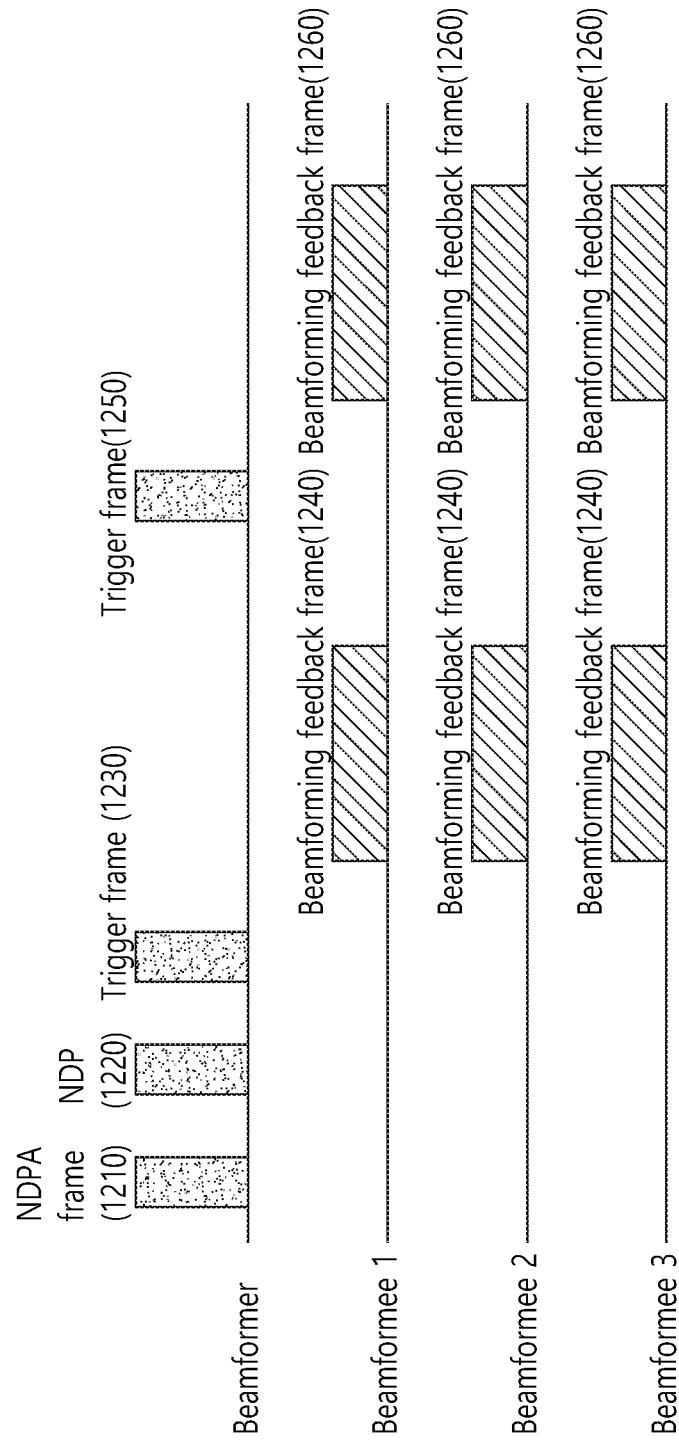
FIG. 12 is a conceptual diagram showing a method for transmitting an MU-MIMO frame based on a sounding procedure according to the present embodiment.

FIG. 12 is a conceptual diagram showing a method for transmitting an MU-MIMO frame based on a sounding procedure according to the present embodiment.

FIG. 12 discloses a method for transmitting a frame based on a sounding procedure for a plurality of STAs. More specifically, a beamformer hat has transmitted an NDPA frame 1210 having at least one STA information field may transmit a beamforming report poll trigger frame 1230 after an SIFS since the NDP frame 1210 was transmitted. This reason for this is that the beamformer receives a beamforming feedback frame 1240 from a beamformee designated in the same TXOP. Furthermore, the beamformer receive the beamforming feedback frame 1240 and then may transmit an additional beamforming report poll trigger frame after an SIFS. The reason for this is that the beamformer subsequently receives beamforming feedback from the beamformee differently designated in the same TXOP.

That is, the beamformee may transmit a beamforming feedback frame in response to the beamforming report poll trigger frame (or the trigger frame). The beamforming report poll trigger frame includes the AID of an STA included in the user information fields 1160#1, ..., 1160#N shown in FIG. 11.

In the 802.11ac system, in order to perform beamforming, feedback is transmitted using carrier grouping. In this case, the number of carrier groupings used (i.e., Ng) is 1, 2 or 4 regardless of a band used for data transmission. In contrast, in the 802.11ax system, in order to enhance efficiency of data transmission, feedback is transmitted using a 4× symbol structure and OFDMA compared to 802.11ac. In this case, if data is transmitted by performing beamforming, there is a need for a feedback method for performing efficient beamforming. Accordingly, this specification proposes a method for applying an efficient beamforming feedback tone index and a Q matrix, which can reduce feedback overhead, by taking into consideration a transmission method in the 802.11ax system. In this case, it is assumed that an NDP to which a 1×, 2×, 4× HE-LTF has been applied is used for sounding.

The method for applying a feedback tone index and a Q matrix is as follows.

A beamformee performs channel estimation through NDP sounding in all of subcarriers other than a guard subcarrier (or a guard tone), a DC subcarrier (or a DC tone), a pilot subcarrier (or a pilot tone), and a null subcarrier (or a leftover tone), and feeds channel information back. The fed-back channel information may include information, such as channel quality information (CQI) and/or channel directional information (CDI). A beamformer forms a Q matrix using information fed back in all of subcarriers other than a guard subcarrier, a DC subcarrier, a pilot subcarrier, and a null subcarrier, and applies the Q matrix upon data transmission.

Hereinafter, there is proposed a method for applying a unified feedback tone index, which is used in a situation in which OFDMA is used in addition to a full bandwidth (or non-OFDMA). In a negative part and a positive part, a feedback tone index is symmetric.

More specifically, this specification proposes a method for applying a feedback tone index for 20 MHz, 40 MHz and 80 MHz transmission for each RU (using OFDMA). A feedback tone index set based on a full bandwidth has a possibility that it may be set less than a feedback tone index set for each RU. Accordingly, it may be necessary to design a feedback tone index more suitable for an OFDMA system. In this case, fed-back information may include SNR information, channel status information for beamforming, etc.

Furthermore, when a 1× HE-LTF and a 2× HE-LTF are used, a situation in which information is fed back at the location where an HE-LTF coefficient is present is taken into consideration. In the 802.11ax system, if a 1× HE-LTF is used, an HE-LTF coefficient is inserted into only a tone having an even index. If a 2× HE-LTF is used, an HE-LTF coefficient is inserted into only a tone having an index of a multiple of 4. That is, there are proposed a method for applying a feedback tone index after sounding in an NDP in which a 1× HE-LTF is used and a method for applying a feedback tone index after sounding in an NDP in which a 2× HE-LTF is used.

In this case, if a 1× HE-LTF is used, Ng=4, 8, 16 may be taken into consideration. In the 1× HE-LTF, Ng=2 is not taken into consideration because an HE-LTF coefficient is inserted every 4 blanks. Furthermore, if a 2× HE-LTF is used, Ng=2, 4, 8, 16 may be taken into consideration. In the 2× HE-LTF, Ng=2 may be taken into consideration because an HE-LTF coefficient every 2 blanks.

In the method, a feedback tone is set in the Ng unit. Ng may correspond to feedback granularity. More specifically, in the method, a feedback tone is set in the Ng unit from the first tone (or the last tone) within an RU. The first tone (or the last tone) may correspond to the first tone (or the last tone) into which an HE-LTF coefficient is inserted in the RU.

If a feedback tone overlaps a pilot tone when the feedback tone is set in the Ng unit as in the method, a tone that is located right before or right after a corresponding feedback tone and into which an HE-LTF coefficient has been inserted may be set as a feedback tone. In some embodiments, a corresponding feedback tone may be excluded from a feedback tone.

Furthermore, when a feedback tone is set in the Ng unit using the method, if a feedback tone overlaps a tone into which an HE-LTF coefficient has not been inserted, a tone that is located right before or right after a corresponding feedback tone and into which an HE-LTF coefficient has been inserted may be set as a feedback tone. In some embodiments, a corresponding feedback tone may be excluded from a feedback tone.

Furthermore, in the method, the last tone (or the first tone) within an RU may be set as a feedback tone regardless of an Ng unit.

Furthermore, in the method, in a situation in which a specific Ng is present, the positions of feedback tones and the number of feedback tones may be set identically in each of RUs having the same size.

Furthermore, a feedback tone may be set by applying the same method as the method in a unit of 2.5 MHz or 5 MHz other than an RU.

Accordingly, the number of samples used to form a Q matrix in a transmission stage (or a beamformer) can be increased.

Example (1)—20 MHz

First, a method for configuring a feedback tone index (or a feedback subcarrier index) for transmission in a 20 MHz band is described below.

Figure 13:
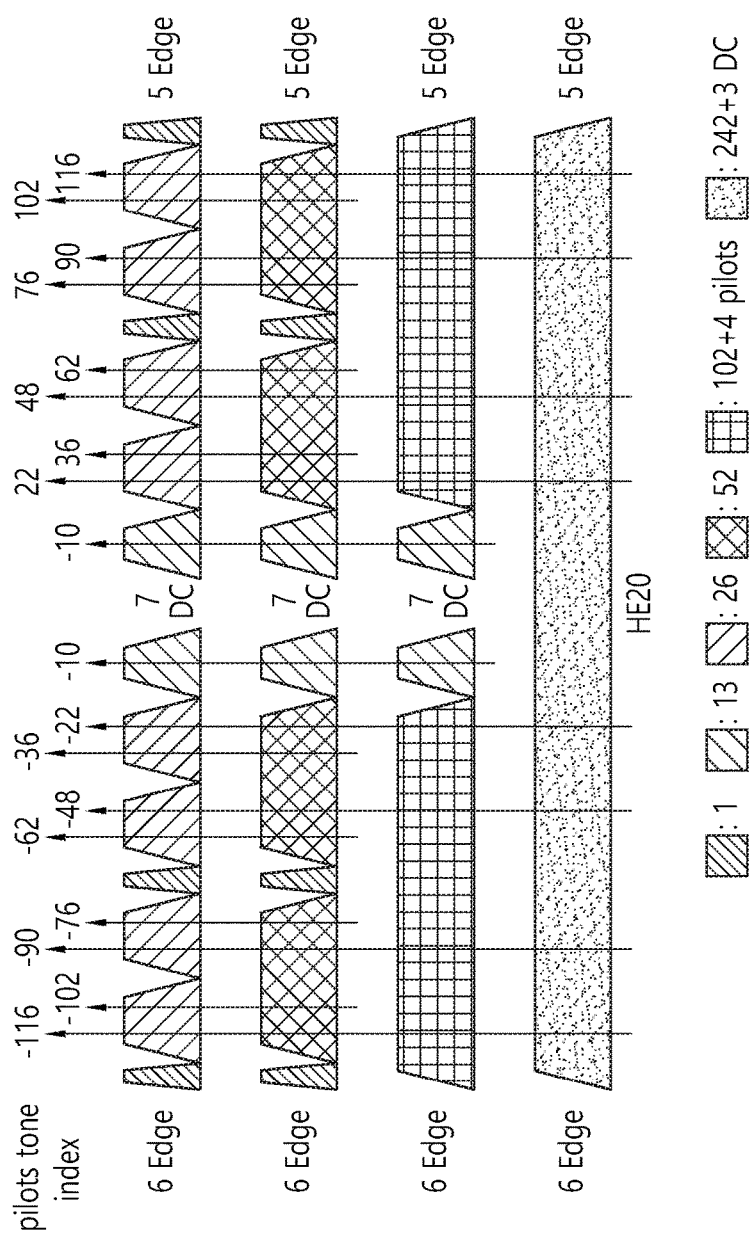
FIG. 13 is a diagram showing a pilot subcarrier index in a resource unit (RU) used on a 20 MHz band according to the present embodiment.

FIG. 13 is a diagram showing a pilot subcarrier index in a resource unit (RU) used on a 20 MHz band according to the present embodiment.

Referring to FIG. 13, if a 26-RU and/or a 52-RU is used on the 20 MHz band, a pilot subcarrier index may be ±{10, 22, 36, 48, 62, 76, 90, 102, 116}. If a 106-RU and/or 242-RU (full band) is used on the 20 MHz band, a pilot subcarrier index may be ±{22, 48, 90, 116}.

On the 20 MHz band, a first or ninth 26-RU may be indicated as a tone index range of ±{121:96}. A second or eighth 26-RU may be indicated as a tone index range of ±{95:70}. A third or seventh 26-RU may be indicated as a tone index range of ±{68:43}. A fourth or sixth 26-RU may be indicated as a tone index range of ±{42:17}. A fifth (middle) 26-RU may be indicated as a tone index range of ±{16:4}.

Furthermore, on the 20 MHz band, a first or fourth 52-RU may be indicated as a tone index range of ±{121:70}. A second or third 52-RU may be indicated as a tone index range of ±{68:17}. A first or second 106-RU may be indicated as a tone index range of ±{122:17}. A full bandwidth (242-RU) may be indicated as a tone index range of ±{122:2}.

(1)-A) 2× HE-LTF, Ng=2

If a 2× HE-LTF is used and Ng=2, a feedback tone index set for each RU is as follows.

In the first or ninth 26-RU, a feedback tone index may be set as ±{120 118 114 112 110 108 106 104 100 98 96}. In the second or eighth 26-RU, a feedback tone index may be set as ±{94 92 88 86 84 82 80 78 74 72 70}. In the third or seventh 26-RU, a feedback tone index may be set as ±{68 66 64 60 58 56 54 52 50 46 44}. In the fourth or sixth 26-RU, a feedback tone index may be set as ±{42 40 38 34 32 30 28 26 24 20 18}. In the fifth (middle) 26-RU, a feedback tone index may be set as ±{16 14 12 8 6 4}.

Furthermore, in the first or fourth 52-RU, a feedback tone index may be set as ±{120 118 114 112 110 108 106 104 100 98 96 94 92 88 86 84 82 80 78 74 72 70}. In the second or third 52-RU, a feedback tone index may be set as ±{68 66 64 60 58 56 54 52 50 46 44 42 40 38 34 32 30 28 26 24 20 18}. In the first or second 106-RU, a feedback tone index may be set as ±{122 120 118 114 112 110 108 106 104 102 100 98 96 94 92 88 86 84 82 80 78 76 74 72 70 68 66 64 62 60 58 56 54 52 50 46 44 42 40 38 36 34 32 30 28 26 24 20 18}. In the full bandwidth (242-RU), a feedback tone index may be set as ±{122 120 118 114 112 110 108 106 104 102 100 98 96 94 92 88 86 84 82 80 78 76 74 72 70 68 66 64 62 60 58 56 54 52 50 46 44 42 40 38 36 34 32 30 28 26 24 20 18 16 14 12 10 8 6 4 2}.

(1)-B) 2× HE-LTF, Ng=4

If a 2× HE-LTF is used and Ng=4, a feedback tone index set for each RU is as follows.

In the first or ninth 26-RU, a feedback tone index may be set as ±{120 118/114 112 108 104 100 96}. In the second or eighth 26-RU, a feedback tone index may be set as ±{94 92/88 86 82 78 74 70}. In the third or seventh 26-RU, a feedback tone index may be set as ±{68 64 60 56 52 50/46 44}. In the fourth or sixth 26-RU, a feedback tone index may be set as ±{42 38 34 30 26 24/20 18}. In the fifth (middle) 26-RU, a feedback tone index may be set as ±{16 12 8 4}.

In this case, the underlined tone index a may be set as a feedback tone index or may not be set. A tone index indicated by "a/b" indicates that a corresponding tone index may be "a" or "b." The same principle is applied to the following embodiments.

Furthermore, in the first or fourth 52-RU, a feedback tone index may be set as ±{120 118/114 112 108 104 100 96 92 88 84 80 78/74 72 70} or ±{120 118 114 110 106 104/100 98 94 92/88 86 82 78 74 70}. In the second or third 52-RU, a feedback tone index may be set as ±{68 64 60 56 52 50/46 44 40 38/34 32 28 24 20 18} or ±{68 66 64/60 58 54 50 46 42 38 34 30 26 24/20 18}. In the first or second 106-RU, a feedback tone index may be set as ±{122 118 114 110 106 102 98 94 92/88 86 82 78 74 70 66 62 58 54 50 46 42 38 34 30 26 24/20 18}. In the full bandwidth (242-RU), a feedback tone index may be set as ±{122 118 114 110 106 102 98 94 92/88 86 82 78 74 70 66 62 58 54 50 46 42 38 34 30 26 24/20 18 14 10 6 2}.

(1)-C) 1× HE-LTF, Ng=4

If a 1× HE-LTF is used and Ng=4, a feedback tone index set for each RU is as follows.

In the first or ninth 26-RU, a feedback tone index may be set as ±{120 112 108 104 100 96}. In the second or eighth 26-RU, a feedback tone index may be set as ±{92 88 84 80 72}. In the third or seventh 26-RU, a feedback tone index may be set as ±{68 64 60 56 52 44}. In the fourth or sixth 26-RU, a feedback tone index may be set as ±{40 32 28 24 20}. In the fifth (middle) 26-RU, a feedback tone index may be set as ±{16 12 8 4}.

Furthermore, in the first or fourth 52-RU, a feedback tone index may be set as ±{120 112 108 104 100 96 92 88 84 80 72}. In the second or third 52-RU, a feedback tone index may be set as ±{68 64 60 56 52 44 40 32 28 24 20}. In the first or second 106-RU, a feedback tone index may be set as ±{120 112 108 104 100 96 92 88 84 80 76 72 68 64 60 56 52 44 40 36 32 28 24 20}. In the full bandwidth (242-RU), a feedback tone index may be set as ±{120 112 108 104 100 96 92 88 84 80 76 72 68 64 60 56 52 44 40 36 32 28 24 20 16 12 8 4}.

(1)-D) 2× HE-LTF, Ng=8

If a 2× HE-LTF is used and Ng=8, a feedback tone index set for each RU is as follows.

In the first or ninth 26-RU, a feedback tone index may be set as ±{120 112 104 96}. In the second or eighth 26-RU, a feedback tone index may be set as ±{94 86 78 70}. In the third or seventh 26-RU, a feedback tone index may be set as ±{68 60 52 44}. In the fourth or sixth 26-RU, a feedback tone index may be set as ±{42 34 26 18}. In the fifth (middle) 26-RU, a feedback tone index may be set as ±{16 8 4} or ±{16 12 4}.

Furthermore, in the first or fourth 52-RU, a feedback tone index may be set as ±{120 112 104 96 88 80 72 70} or ±{120 118 110 104/100 94 86 78 70}. In the second or third 52-RU, a feedback tone index may be set as ±{68 60 52 44 38/34 28 20 18} or ±{68 66 58 50 42 34 26 18}. In the first or second 106-RU, a feedback tone index may be set as ±{122 114 106 98 92/88 82 74 66 58 50 42 34 26 18}. In the full bandwidth (242-RU), a feedback tone index may be set as ±{122 114 106 98 92/88 82 74 66 58 50 42 34 26 18 10 2}.

(1)-E) a 1× HE-LTF, Ng=8

If a 1× HE-LTF is used and Ng=8, a feedback tone index set for each RU is as follows.

In the first or ninth 26-RU, a feedback tone index may be set as ±{120 112 104 96}. In the second or eighth 26-RU, a feedback tone index may be set as ±{92 84 80/72 72} or ±{92 88 80 72}. In the third or seventh 26-RU, a feedback tone index may be set as ±{68 60 52 44}. In the fourth or sixth 26-RU, a feedback tone index may be set as ±{40 32 24 20} or ±{40 40/32 28 20}. In the fifth (middle) 26-RU, a feedback tone index may be set as ±{16 8 4} or ±{16 12 4}.

Furthermore, in the first or fourth 52-RU, a feedback tone index may be set as ±{120 112 104 96 88 80 72}. In the second or third 52-RU, a feedback tone index may be set as ±{68 60 52 44 40/32 28 20}. In the first or second 106-RU, a feedback tone index may be set as ±{120 112 104 96 88 80 72 64 56 52/44 40 32 24 20} or ±{120 120/112 108 100 92 84 76 68 60 52 44 36 28 20}. In the full bandwidth (242-RU), a feedback tone index may be set as ±{120 112 104 96 88 80 72 64 56 52/44 40 32 24 16 8 4} or ±{120 120/112 108 100 92 84 76 68 60 52 44 36 28 20 12 4}.

(1)-F) 2× HE-LTF, Ng=16

If a 2× HE-LTF is used and Ng=16, a feedback tone index set for each RU is as follows.

In the first or ninth 26-RU, a feedback tone index may be set as ±{120 104 96} or ±{120 112 96}. In the second or eighth 26-RU, a feedback tone index may be set as ±{94 78 70} or ±{94 86 70}. In the third or seventh 26-RU, a feedback tone index may be set as ±{68 52 44} or ±{68 60 44}. In the fourth or sixth 26-RU, a feedback tone index may be set as ±{42 26 18} or ±{42 34 18}. In the fifth (middle) 26-RU, a feedback tone index may be set as ±{16 4} or ±{16 4}.

Furthermore, in the first or fourth 52-RU, a feedback tone index may be set as ±{120 104 88 72 70} or ±{120 118 104/100 86 70}. In the second or third 52-RU, a feedback tone index may be set as ±{68 52 38/34 20 18} or ±{68 66 50 34 18}. In the first or second 106-RU, a feedback tone index may be set as ±{122 106 92/88 74 58 42 26 18} or ±{122 114 98 82 66 50 34 18}. In the full bandwidth (242-RU), a feedback tone index may be set as ±{122 106 92/88 74 58 42 26 10 2} or ±{122 114 98 82 66 50 34 18 2}.

(1)-G) 1× HE-LTF, Ng=16

If a 1× HE-LTF is used and Ng=16, a feedback tone index set for each RU is as follows.

In the first or ninth 26-RU, a feedback tone index may be set as ±{120 104 96} or ±{120 112 96}. In the second or eighth 26-RU, a feedback tone index may be set as ±{92 80/72 72} or ±{92 88 72}. In the third or seventh 26-RU, a feedback tone index may be set as ±{68 52 44} or ±{68 60 44}. In the fourth or sixth 26-RU, a feedback tone index may be set as ±{40 24 20} or ±{40 40/32 20}. In the fifth (middle) 26-RU, a feedback tone index may be set as ±{16 4} or ±{16 4}.

Furthermore, in the first or fourth 52-RU, a feedback tone index may be set as ±{120 104 88 72}. In the second or third 52-RU, a feedback tone index may be set as ±{68 52 40/32 20}. In the first or second 106-RU, a feedback tone index may be set as ±{120 104 88 72 56 40 24 20} or ±{120 120/112 100 84 68 52 36 20}. In the full bandwidth (242-RU), a feedback tone index may be set as ±{120 104 88 72 56 40 24 8 4} or ±{120 120/112 100 84 68 52 36 20 4}.

Example (2)—40 MHz

A method for configuring a feedback tone index (or a feedback subcarrier index) for transmission in a 40 MHz band is described below.

Figure 14:
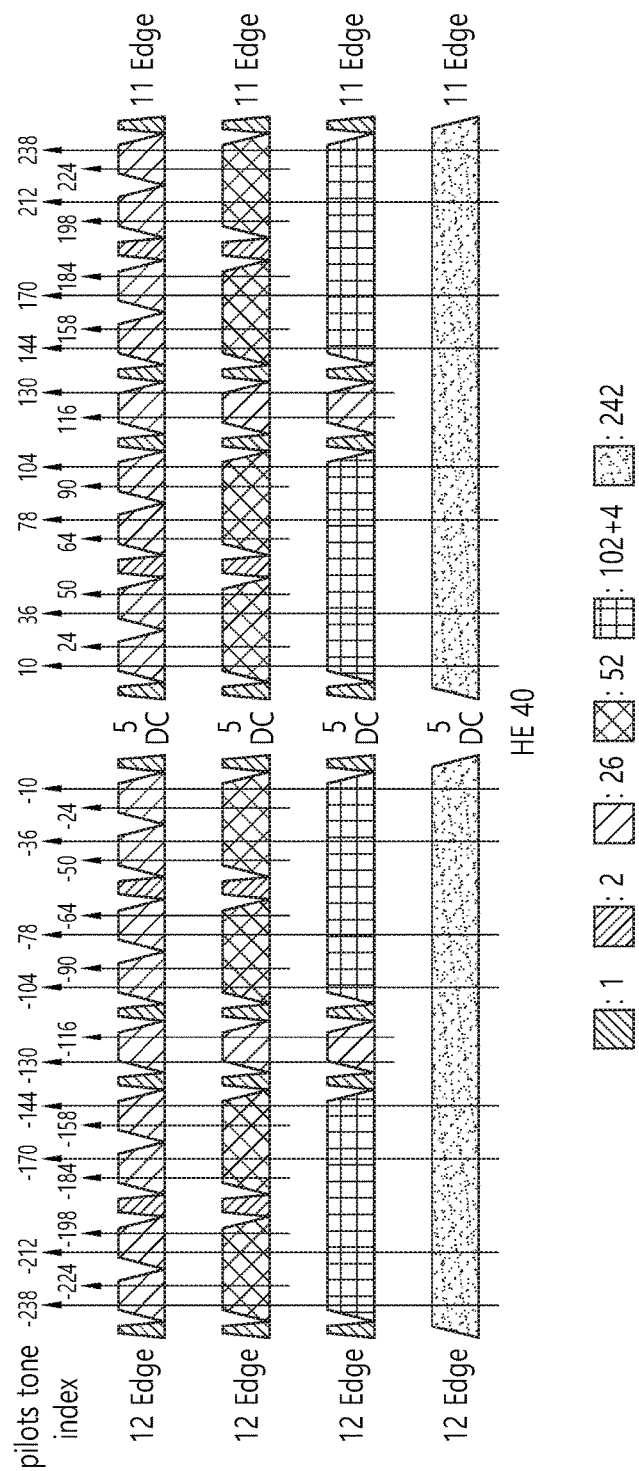
FIG. 14 is a diagram showing a pilot subcarrier index used on a 40 MHz band in a resource unit (RU) according to the present embodiment.

FIG. 14 is a diagram showing a pilot subcarrier index used on a 40 MHz band in a resource unit (RU) according to the present embodiment.

Referring to FIG. 14, if a 26-RU and/or a 52-RU is used on the 40 MHz band, a pilot subcarrier index may be ±{10, 24, 36, 50, 64, 78, 90, 104, 116, 130, 144, 158, 170, 184, 198, 212, 224, 238}. If a 106-RU and/or a 242-RU and/or a 484-RU (full band) is used on the 40 MHz band, a pilot subcarrier index may be ±{10, 36, 78, 104, 144, 170, 212, 238}.

On the 40 MHz band, a first or eighteenth 26-RU may be indicated as a tone index range of ±{243:218}. A second or seventeenth 26-RU may be indicated as a tone index range of ±{217:192}. A third or sixteenth 26-RU may be indicated as a tone index range of ±{189:164}. A fourth or fifteenth 26-RU may be indicated as a tone index range of ±{163:138}. A fifth or fourteenth 26-RU may be indicated as a tone index range of ±{136:111}. A sixth or thirteenth 26-RU may be indicated as a tone index range of ±{109:84}. A seventh or twelfth 26-RU may be indicated as a tone index range of ±{83:58}. An eighth or eleventh 26-RU may be indicated as a tone index range of ±{55:30}. A ninth or tenth 26-RU may be indicated as a tone index range of ±{29:4}.

Furthermore, on the 40 MHz band, a first or eighth 52-RU may be indicated as a tone index range of ±{243:192}. A second or seventh 52-RU may be indicated as a tone index range of ±{189:138}. A third or sixth 52-RU may be indicated as a tone index range of ±{109:58}. A fourth or fifth 52-RU may be indicated as a tone index range of ±{55:4}.

Furthermore, on the 40 MHz band, a first or fourth 106-RU may be indicated as a tone index range of ±{243:138}. A second or third 106-RU may be indicated as a tone index range of ±{109:4}. A first or second 242-RU may be indicated as a tone index range of ±{244:3}. A full bandwidth (484-RU) may be indicated as a tone index range of ±{244:3}.

(2)-A) 2× HE-LTF, Ng=2

If a 2× HE-LTF is used and Ng=2, a feedback tone index set for each RU is as follows.

In the first or eighteenth 26-RU, a feedback tone index may be set as ±{242 240 236 234 232 230 228 226 222 220 218}. In the second or seventeenth 26-RU, a feedback tone index may be set as ±{216 214 210 208 206 204 202 200 196 194 192}. In the third or sixteenth 26-RU, a feedback tone index may be set as ±{188 186 182 180 178 176 174 172 168 166 164}. In the fourth or fifteenth 26-RU, a feedback tone index may be set as ±{162 160 156 154 152 150 148 146 142 140 138}. In the fifth or fourteenth 26-RU, a feedback tone index may be set as ±{136 134 132 128 126 124 122 120 118 114 112}. In the sixth or thirteenth 26-RU, a feedback tone index may be set as ±{108 106 102 100 98 96 94 92 88 86 84}. In the seventh or twelfth 26-RU, a feedback tone index may be set as ±{82 80 76 74 72 70 68 66 62 60 58}. In the eighth or eleventh 26-RU, a feedback tone index may be set as ±{54 52 48 46 44 42 40 38 34 32 30}. In the ninth or tenth 26-RU, a feedback tone index may be set as ±{28 26 22 20 18 16 14 12 8 6 4}.

Furthermore, in the first or eighth 52-RU, a feedback tone index may be set as ±{242 240 236 234 232 230 228 226 222 220 218 216 214 210 208 206 204 202 200 196 194 192}. In the second or seventh 52-RU, a feedback tone index may be set as ±{188 186 182 180 178 176 174 172 168 166 164 162 160 156 154 152 150 148 146 142 140 138}. In the third or sixth 52-RU, a feedback tone index may be set as ±{108 106 102 100 98 96 94 92 88 86 84 82 80 76 74 72 70 68 66 62 60 58}. In the fourth or fifth 52-RU, a feedback tone index may be set as ±{54 52 48 46 44 42 40 38 34 32 30 28 26 22 20 18 16 14 12 8 6 4}.

Furthermore, in the first or fourth 106-RU, a feedback tone index may be set as ±{242 240 236 234 232 230 228 226 224 222 220 218 216 214 210 208 206 204 202 200 198 196 194 192 190 188 186 184 182 180 178 176 174 172 168 166 164 162 160 158 156 154 152 150 148 146 142 140 138}. In the second or third 106-RU, a feedback tone index may be set as ±{108 106 102 100 98 96 94 92 90 88 86 84 82 80 76 74 72 70 68 66 64 62 60 58 56 54 52 50 48 46 44 42 40 38 34 32 30 28 26 24 22 20 18 16 14 12 8 6 4}. In the first or second 106-RU, a feedback tone index may be set as ±{244 242 240 236 234 232 230 228 226 224 222 220 218 216 214 210 208 206 204 202 200 198 196 194 192 190 188 186 184 182 180 178 176 174 172 168 166 164 162 160 158 156 154 152 150 148 146 142 140 138 136 134 132 130 128 126 124 122 120 118 116 114 112 110 108 106 102 100 98 96 94 92 90 88 86 84 82 80 76 74 72 70 68 66 64 62 60 58 56 54 52 50 48 46 44 42 40 38 34 32 30 28 26 24 22 20 18 16 14 12 8 6 4}. In the full bandwidth (484-RU), a feedback tone index may be set as ±{244 242 240 236 234 232 230 228 226 224 222 220 218 216 214 210 208 206 204 202 200 198 196 194 192 190 188 186 184 182 180 178 176 174 172 168 166 164 162 160 158 156 154 152 150 148 146 142 140 138 136 134 132 130 128 126 124 122 120 118 116 114 112 110 108 106 102 100 98 96 94 92 90 88 86 84 82 80 76 74 72 70 68 66 64 62 60 58 56 54 52 50 48 46 44 42 40 38 34 32 30 28 26 24 22 20 18 16 14 12 8 6 4}.

(2)-B) 2× HE-LTF, Ng=4

If a 2× HE-LTF is used and Ng=4, a feedback tone index set for each RU is as follows.

In the first or eighteenth 26-RU, a feedback tone index may be set as ±{242 240/236 234 230 226 222 218}. In the second or seventeenth 26-RU, a feedback tone index may be set as ±{216 214/210 208 204 200 196 192}. In the third or sixteenth 26-RU, a feedback tone index may be set as ±{188 186/182 180 176 172 168 164}. In the fourth or fifteenth 26-RU, a feedback tone index may be set as ±{162 160/156 154 150 146 142 138}. In the fifth or fourteenth 26-RU, a feedback tone index may be set as ±{136 132 128 124 120 118/114 112}. In the sixth or thirteenth 26-RU, a feedback tone index may be set as ±{108 106/102 100 96 92 88 84}. In the seventh or twelfth 26-RU, a feedback tone index may be set as ±{82 80/76 74 70 66 62 58}. In the eighth or eleventh 26-RU, a feedback tone index may be set as ±{54 52/48 46 42 38 34 30}. In the ninth or tenth 26-RU, a feedback tone index may be set as ±{28 26/22 20 16 12 8 4}.

Furthermore, in the first or eighth 52-RU, a feedback tone index may be set as ±{242 240/236 234 230 226 222 218 214 210 206 202 200/196 194 192} or ±{242 240 236 232 228 226/222 220 216 214/210 208 204 200 196 192}. In the second or seventh 52-RU, a feedback tone index may be set as ±{188 186/182 180 176 172 168 164 160 156 152 148 146/142 140 138} or ±{188 186 182 178 174 172/168 166 162 160/156 154 150 146 142 138}. In the third or sixth 52-RU, a feedback tone index may be set as ±{108 106/102 100 96 92 88 84 80 76 72 68 66/62 60 58} or ±{108 106 102 98 94 92/88 86 82 80/76 74 70 66 62 58}. In the fourth or fifth 52-RU, a feedback tone index may be set as ±{54 52/48 46 42 38 34 30 26 22 18 14 12/8 6 4} or ±{54 52 48 44 40 38/34 32 28 26/22 20 16 12 8 4}.

Furthermore, in the first or fourth 106-RU, a feedback tone index may be set as ±{242 240/236 234 230 226 222 218 214 210 206 202 198 194 190 186 182 178 174 172/168 166 162 158 154 150 146 142 138}. In the second or third 106-RU, a feedback tone index may be set as ±{108 106/102 100 96 92 88 84 80 76 72 68 64 60 56 52 48 44 40 38/34 32 28 24 20 16 12 8 4}. In the first or second 106-RU, a feedback tone index may be set as ±{244 240 236 232 228 224 220 216 214/210 208 204 200 196 192 188 184 180 176 172 168 164 160 156 152 148 146/142 140 136 132 128 124 120 116 112 108 106/102 100 96 92 88 84 80 76 72 68 64 60 56 52 48 44 40 38/34 32 28 24 20 16 12 8 4}. In the full bandwidth (484-RU), a feedback tone index may be set as ±{244 240 236 232 228 224 220 216 214/210 208 204 200 196 192 188 184 180 176 172 168 164 160 156 152 148 146/142 140 136 132 128 124 120 116 112 108 106/102 100 96 92 88 84 80 76 72 68 64 60 56 52 48 44 40 38/34 32 28 24 20 16 12 8 4}.

(2)-C) 1× HE-LTF, Ng=4

If a 1× HE-LTF is used and Ng=4, a feedback tone index set for each RU is as follows.

In the first or eighteenth 26-RU, a feedback tone index may be set as ±{240 236 232 228 220}. In the second or seventeenth 26-RU, a feedback tone index may be set as ±{216 208 204 200 196 192}. In the third or sixteenth 26-RU, a feedback tone index may be set as ±{188 180 176 172 168 164}. In the fourth or fifteenth 26-RU, a feedback tone index may be set as ±{160 156 152 148 140}. In the fifth or fourteenth 26-RU, a feedback tone index may be set as ±{136 132 128 124 120 112}. In the sixth or thirteenth 26-RU, a feedback tone index may be set as ±{108 100 96 92 88 84}. In the seventh or twelfth 26-RU, a feedback tone index may be set as ±{80 76 72 68 60}. In the eighth or eleventh 26-RU, a feedback tone index may be set as ±{52 48 44 40 32}. In the ninth or tenth 26-RU, a feedback tone index may be set as ±{28 20 16 12 8 4}.

Furthermore, in the first or eighth 52-RU, a feedback tone index may be set as ±{240 236 232 228 220 216 208 204 200 196 192}. In the second or seventh 52-RU, a feedback tone index may be set as ±{188 180 176 172 168 164 160 156 152 148 140}. In the third or sixth 52-RU, a feedback tone index may be set as ±{108 100 96 92 88 84 80 76 72 68 60}. In the fourth or fifth 52-RU, a feedback tone index may be set as ±{52 48 44 40 32 28 20 16 12 8 4}.

Furthermore, in the first or fourth 106-RU, a feedback tone index may be set as ±{240 236 232 228 224 220 216 208 204 200 196 192 188 184 180 176 172 168 164 160 156 152 144 140}. In the second or third 106-RU, a feedback tone index may be set as ±{108 100 96 92 88 84 80 76 72 68 64 60 56 52 48 44 40 32 28 24 20 16 12 8 4}. In the first or second 106-RU, a feedback tone index may be set as ±{244 240 236 232 228 224 220 216 208 204 200 196 192 188 184 180 176 172 168 164 160 156 152 148 140 136 132 128 124 120 116 112 108 100 96 92 88 84 80 76 72 68 64 60 56 52 48 44 40 32 28 24 20 16 12 8 4}. In the full bandwidth (484-RU), a feedback tone index may be set as ±{244 240 236 232 228 224 220 216 208 204 200 196 192 188 184 180 176 172 168 164 160 156 152 148 140 136 132 128 124 120 116 112 108 100 96 92 88 84 80 76 72 68 64 60 56 52 48 44 40 32 28 24 20 16 12 8 4}.

(2)-D) 2× HE-LTF, Ng=8

If a 2× HE-LTF is used and Ng=8, a feedback tone index set for each RU is as follows.

In the first or eighteenth 26-RU, a feedback tone index may be set as ±{242 234 226 218}. In the second or seventeenth 26-RU, a feedback tone index may be set as ±{216 208 200 192}. In the third or sixteenth 26-RU, a feedback tone index may be set as ±{188 180 172 164}. In the fourth or fifteenth 26-RU, a feedback tone index may be set as ±{162 154 146 138}. In the fifth or fourteenth 26-RU, a feedback tone index may be set as ±{136 128 120 112}. In the sixth or thirteenth 26-RU, a feedback tone index may be set as ±{108 100 92 84}. In the seventh or twelfth 26-RU, a feedback tone index may be set as ±{82 74 66 58}. In the eighth or eleventh 26-RU, a feedback tone index may be set as ±{54 46 38 30}. In the ninth or tenth 26-RU, a feedback tone index may be set as ±{28 20 12 4}.

Furthermore, in the first or eighth 52-RU, a feedback tone index may be set as ±{242 234 226 218 210 202 194 192} or ±{242 240 232 226/222 216 208 200 192}. In the second or seventh 52-RU, a feedback tone index may be set as ±{188 180 172 164 156 148 140 138} or ±{188 186 178 172/168 162 154 146 138}. In the third or sixth 52-RU, a feedback tone index may be set as ±{108 100 92 84 76 68 60 58} or ±{108 106 98 92/88 82 74 66 58}. In the fourth or fifth 52-RU, a feedback tone index may be set as ±{54 46 38 30 22 14 6 4} or ±{54 52 44 38/34 28 20 12 4}.

Furthermore, in the first or fourth 106-RU, a feedback tone index may be set as ±{242 234 226 218 210 202 194 186 178 172/168 162 154 146 138}. In the second or third 106-RU, a feedback tone index may be set as ±{108 100 92 84 76 68 60 52 44 38/34 28 20 12 4}. In the first or second 106-RU, a feedback tone index may be set as ±{244 236 228 220 214/210 204 196 188 180 172 164 156 148 140 132 124 116 108 100 92 84 76 68 60 52 44 38/34 28 20 12 4}. In the full bandwidth (484-RU), a feedback tone index may be set as ±{244 236 228 220 214/210 204 196 188 180 172 164 156 148 140 132 124 116 108 100 92 84 76 68 60 52 44 38/34 28 20 12 4}.

(2)-E) 1× HE-LTF, Ng=8

If a 1× HE-LTF is used and Ng=8, a feedback tone index set for each RU is as follows.

In the first or eighteenth 26-RU, a feedback tone index may be set as ±{240 232 228/220 220} or ±{240 236 228 220}. In the second or seventeenth 26-RU, a feedback tone index may be set as ±{216 208 200 192}. In the third or sixteenth 26-RU, a feedback tone index may be set as ±{188 180 172 164}. In the fourth or fifteenth 26-RU, a feedback tone index may be set as ±{160 152 148/140 140} or ±{160 156 148 140}. In the fifth or fourteenth 26-RU, a feedback tone index may be set as ±{136 128 120 112}. In the sixth or thirteenth 26-RU, a feedback tone index may be set as ±{108 100 92 84}. In the seventh or twelfth 26-RU, a feedback tone index may be set as ±{80 72 68/60 60} or ±{80 76 68 60}. In the eighth or eleventh 26-RU, a feedback tone index may be set as ±{52 44 40/32 32} or ±{52 48 40 32}. In the ninth or tenth 26-RU, a feedback tone index may be set as ±{28 20 12 4}.

Furthermore, in the first or eighth 52-RU, a feedback tone index may be set as ±{240 232 228/220 216 208 200 192}. In the second or seventh 52-RU, a feedback tone index may be set as ±{188 180 172 164 156 148 140}. In the third or sixth 52-RU, a feedback tone index may be set as ±{108 100 92 84 76 68 60}. In the fourth or fifth 52-RU, a feedback tone index may be set as ±{52 44 40/32 28 20 12 4}.

Furthermore, in the first or fourth 106-RU, a feedback tone index may be set as ±{240 232 224 216 208 200 192 184 176 168 160 152 144 140} or ±{240 236 228 220 216/208 204 196 188 180 172 164 156 148 140}. In the second or third 106-RU, a feedback tone index may be set as ±{108 100 92 84 76 68 60 52 44 40/32 28 20 12 4}. In the first or second 106-RU, a feedback tone index may be set as ±{244 236 228 220 216/208 204 196 188 180 172 164 156 148 140 132 124 116 108 100 92 84 76 68 60 52 44 40/32 28 20 12 4}. In the full bandwidth (484-RU), a feedback tone index may be set as ±{244 236 228 220 216/208 204 196 188 180 172 164 156 148 140 132 124 116 108 100 92 84 76 68 60 52 44 40/32 28 20 12 4}.

(2)-F) 2× HE-LTF, Ng=16

If a 2× HE-LTF is used and Ng=16, a feedback tone index set for each RU is as follows.

In the first or eighteenth 26-RU, a feedback tone index may be set as ±{242 226 218} or ±{242 234 218}. In the second or seventeenth 26-RU, a feedback tone index may be set as ±{216 200 192} or ±{216 208 192}. In the third or sixteenth 26-RU, a feedback tone index may be set as ±{188 172 164} or ±{188 180 164}. In the fourth or fifteenth 26-RU, a feedback tone index may be set as ±{162 146 138} or {162 154 138}. In the fifth or fourteenth 26-RU, a feedback tone index may be set as ±{136 120 112} or ±{136 128 112}. In the sixth or thirteenth 26-RU, a feedback tone index may be set as ±{108 92 84} or ±{108 100 84}. In the seventh or twelfth 26-RU, a feedback tone index may be set as ±{82 66 58} or ±{82 74 58}. In the eighth or eleventh 26-RU, a feedback tone index may be set as ±{54 38 30} or ±{54 46 30}. In the ninth or tenth 26-RU, a feedback tone index may be set as ±{28 12 4} or ±{28 20 4}.

Furthermore, in the first or eighth 52-RU, a feedback tone index may be set as ±{242 226 210 194 192} or ±{242 240 226/222 208 192}. In the second or seventh 52-RU, a feedback tone index may be set as ±{188 172 156 140 138} or ±{188 186 172/168 154 138}. In the third or sixth 52-RU, a feedback tone index may be set as ±{108 92 76 60 58} or ±{108 106 92/88 74 58}. In the fourth or fifth 52-RU, a feedback tone index may be set as ±{54 38 22 6 4} or ±{5452 38/34 20 4}.

Furthermore, in the first or fourth 106-RU, a feedback tone index may be set as ±{242 226 210 194 178 162 146 138} or ±{242 234 218 202 186 172/168 154 138}. In the second or third 106-RU, a feedback tone index may be set as ±{108 92 76 60 44 28 12 4} or ±{108 100 84 68 52 38/34 20 4}. In the first or second 106-RU, a feedback tone index may be set as ±{244 228 214/210 196 180 164 148 132 116 100 84 68 52 38/34 20 4}. In the full bandwidth (484-RU), a feedback tone index may be set as ±{244 228 214/210 196 180 164 148 132 116 100 84 68 52 38/34 20 4}.

(2)-G) 1× HE-LTF, Ng=16

If a 1× HE-LTF is used and Ng=16, a feedback tone index set for each RU is as follows.

In the first or eighteenth 26-RU, a feedback tone index may be set as ±{240 228/220 220} or ±{240 236 220}. In the second or seventeenth 26-RU, a feedback tone index may be set as ±{216 200 192} or ±{216 208 192}. In the third or sixteenth 26-RU, a feedback tone index may be set as ±{188 172 164} or ±{188 180 164}. In the fourth or fifteenth 26-RU, a feedback tone index may be set as ±{160 148/140 140} or ±{160 156 140}. In the fifth or fourteenth 26-RU, a feedback tone index may be set as ±{136 120 112} or ±{136 128 112}. In the sixth or thirteenth 26-RU, a feedback tone index may be set as ±{108 92 84} or ±{108 100 84}. In the seventh or twelfth 26-RU, a feedback tone index may be set as ±{80 68/60 60} or ±{80 76 60}. In the eighth or eleventh 26-RU, a feedback tone index may be set as ±{52 40/32 32} or ±{52 48 32}. In the ninth or tenth 26-RU, a feedback tone index may be set as ±{28 12 4} or ±{28 20 4}.

Furthermore, in the first or eighth 52-RU, a feedback tone index may be set as ±{240 228/220 208 192}. In the second or seventh 52-RU, a feedback tone index may be set as ±{188 172 156 140}. In the third or sixth 52-RU, a feedback tone index may be set as ±{108 92 76 60}. In the fourth or fifth 52-RU, a feedback tone index may be set as ±{52 40/32 20 4}.

Furthermore, in the first or fourth 106-RU, a feedback tone index may be set as ±{240 224 208 192 176 160 144 140} or ±{240 236 220 204 188 172 156 140}. In the second or third 106-RU, a feedback tone index may be set as ±{108 92 76 60 44 28 12 4} or ±{108 100 84 68 52 40/32 20 4}. In the first or second 106-RU, a feedback tone index may be set as ±{244 228 216/208 196 180 164 148 132 116 100 84 68 52 40/32 20 4}. In the full bandwidth (484-RU), a feedback tone index may be set as ±{244 228 216/208 196 180 164 148 132 116 100 84 68 52 40/32 20 4}.

Example (3)—80 MHz

A method for configuring a feedback tone index (or a feedback subcarrier index) for transmission in an 80 MHz band is described below.

Figure 15:
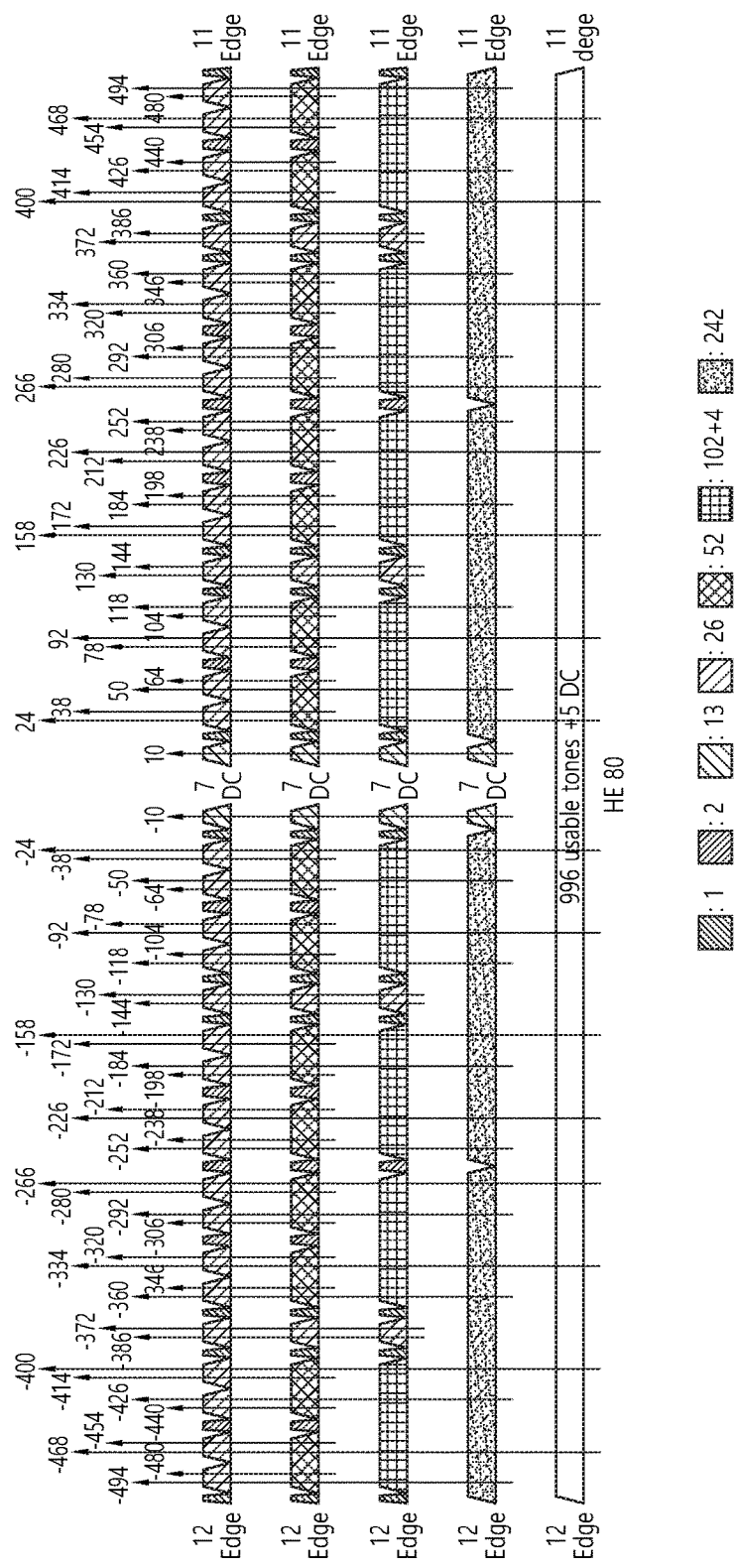
FIG. 15 is a diagram showing a pilot subcarrier index used on an 80 MHz band in a resource unit (RU) according to the present embodiment.

FIG. 15 is a diagram showing a pilot subcarrier index used on an 80 MHz band in a resource unit (RU) according to the present embodiment.

Referring to FIG. 15, if a 26-RU and/or a 52-RU is used on the 80 MHz band, a pilot subcarrier index may be ±{10, 24, 38, 50, 64, 78, 92, 104, 118, 130, 144, 158, 172, 184, 198, 212, 226, 238, 252, 266, 280, 292, 306, 320, 334, 346, 360, 372, 386, 400, 414, 426, 440, 454, 468, 480, 494}. If a 106-RU and/or a 242-RU and/or a 484-RU (full band) is used on the 80 MHz band, a pilot subcarrier index may be ±{24, 50, 92, 118, 158, 184, 226, 252, 266, 292, 334, 360, 400, 426, 468, 494}. If a 996-RU (full band) is used on the 80 MHz band, a pilot subcarrier index may be ±{24, 92, 158, 226, 266, 334, 400, 468}.

On the 80 MHz band, the first or thirty-seventh 26-RU may be indicated as a tone index range of ±{499:474}. The second or thirty-sixth 26-RU may be indicated as a tone index range of ±{473:448}. The third or thirty-fifth 26-RU may be indicated as a tone index range of ±{445:420}. The fourth or thirty-fourth 26-RU may be indicated as a tone index range of ±{419:394}. The fifth or thirty-third 26-RU may be indicated as a tone index range of ±{392:367}. The sixth or thirty-second 26-RU may be indicated as a tone index range of ±{365:340}. The seventh or thirty-first 26-RU may be indicated as a tone index range of ±{339:314}. The eighth or thirtieth 26-RU may be indicated as a tone index range of ±{311:286}. The ninth or twenty-ninth 26-RU may be indicated as a tone index range of ±{285:260}. The tenth or twenty-eighth 26-RU may be indicated as a tone index range of ±{257:232}. The eleventh or twenty-seventh 26-RU may be indicated as a tone index range of ±{231:206}. The twelfth or twenty-sixth 26-RU may be indicated as a tone index range of ±{203:178}. The thirteenth or twenty-fifth 26-RU may be indicated as a tone index range of ±{177:152}. The fourteenth or twenty-fourth 26-RU may be indicated as a tone index range of ±{150:125}. The fifteenth or twenty-third 26-RU may be indicated as a tone index range of ±{123:98}. The sixteenth or twenty-second 26-RU may be indicated as a tone index range of ±{97:72}. The seventeenth or twenty-first 26-RU may be indicated as a tone index range of ±{69:44}. The eighteenth or twentieth 26-RU may be indicated as a tone index range of ±{43:18}. The nineteenth (middle) 26-RU may be indicated as a tone index range of ±{16:4}.

Furthermore, on the 80 MHz band, the first or sixteenth 52-RU may be indicated as a tone index range of ±{499:448}. The second or fifteenth 52-RU may be indicated as a tone index range of ±{445:394}. The third or fourteenth 52-RU may be indicated as a tone index range of ±{365:314}. The fourth or thirteenth 52-RU may be indicated as a tone index range of ±{311:260}. The fifth or twelfth 52-RU may be indicated as a tone index range of ±{257:206}. The sixth or eleventh 52-RU may be indicated as a tone index range of ±{203:152}. The seventh or tenth 52-RU may be indicated as a tone index range of ±{123:72}. The eighth or ninth 52-RU may be indicated as a tone index range of ±{69:18}.

Furthermore, on the 80 MHz band, the first or eighth 106-RU may be indicated as a tone index range of ±{499:394}. The second or seventh 106-RU may be indicated as a tone index range of ±{365:260}. The third or sixth 106-RU may be indicated as a tone index range of ±{257:152}. The fourth or fifth 106-RU may be indicated as a tone index range of ±{123:18}. The first or fourth 242-RU may be indicated as a tone index range of ±{500:259}. The second or third 242-RU may be indicated as a tone index range of ±{258:17}. The first or second 484-RU may be indicated as a tone index range of ±{500:17}. The full bandwidth (996-RU) may be indicated as a tone index range of ±{500:3}.

(3)-A) 2× HE-LTF, Ng=2

If a 2× HE-LTF is used and Ng=2, a feedback tone index set for each RU is as follows.

In the first or thirty-seventh 26-RU, a feedback tone index may be set as ±{498 496 492 490 488 486 484 482 478 476 474}. In the second or thirty-sixth 26-RU, a feedback tone index may be set as ±{472 470 466 464 462 460 458 456 452 450 448}. In the third or thirty-fifth 26-RU, a feedback tone index may be set as ±{444 442 438 436 434 432 430 428 424 422 420}. In the fourth or thirty-fourth 26-RU, a feedback tone index may be set as ±{418 416 412 410 408 406 404 402 398 396 394}. In the fifth or thirty-third 26-RU, a feedback tone index may be set as ±{392 390 388 384 382 380 378 376 374 370 368}. In the sixth or thirty-second 26-RU, a feedback tone index may be set as ±{364 362 358 356 354 352 350 348 344 342 340}. In the seventh or thirty-first 26-RU, a feedback tone index may be set as ±{338 336 332 330 328 326 324 322 318 316 314}. In the eighth or thirtieth 26-RU, a feedback tone index may be set as ±{310 308 304 302 300 298 296 294 290 288 286}. In the ninth or twenty-ninth 26-RU, a feedback tone index may be set as ±{284 282 278 276 274 272 270 268 264 262 260}. In the tenth or twenty-eighth 26-RU, a feedback tone index may be set as ±{256 254 250 248 246 244 242 240 236 234 232}. In the eleventh or twenty-seventh 26-RU, a feedback tone index may be set as ±{230 228 224 222 220 218 216 214 210 208 206}. In the twelfth or twenty-sixth 26-RU, a feedback tone index may be set as ±{202 200 196 194 192 190 188 186 182 180 178}. In the thirteenth or twenty-fifth 26-RU, a feedback tone index may be set as ±{176 174 170 168 166 164 162 160 156 154 152}. In the fourteenth or twenty-fourth 26-RU, a feedback tone index may be set as ±{150 148 146 142 140 138 136 134 132 128 126}. In the fifteenth or twenty-third 26-RU, a feedback tone index may be set as ±{122 120 116 114 112 110 108 106 102 100 98}. In the sixteenth or twenty-second 26-RU, a feedback tone index may be set as ±{96 94 90 88 86 84 82 80 76 74 72}. In the seventeenth or twenty-second 26-RU, a feedback tone index may be set as ±{68 66 62 60 58 56 54 52 48 46 44}. In the eighteenth or twentieth 26-RU, a feedback tone index may be set as ±{42 40 36 34 32 30 28 26 22 20 18}. In the nineteenth (middle) 26-RU, a feedback tone index may be set as ±{16 14 12 8 6 4}.

Furthermore, in the first or sixteenth 52-RU, a feedback tone index may be set as ±{498 496 492 490 488 486 484 482 478 476 474 472 470 466 464 462 460 458 456 452 450 448}. In the second or fifteenth 52-RU, a feedback tone index may be set as ±{444 442 438 436 434 432 430 428 424 422 420 418 416 412 410 408 406 404 402 398 396 394}. In the third or fourteenth 52-RU, a feedback tone index may be set as ±{364 362 358 356 354 352 350 348 344 342 340 338 336 332 330 328 326 324 322 318 316 314}. In the fourth or thirteenth 52-RU, a feedback tone index may be set as ±{310 308 304 302 300 298 296 294 290 288 286 284 282 278 276 274 272 270 268 264 262 260}. In the fifth or twelfth 52-RU, a feedback tone index may be set as ±{256 254 250 248 246 244 242 240 236 234 232 230 228 224 222 220 218 216 214 210 208 206}. In the sixth or eleventh 52-RU, a feedback tone index may be set as ±{202 200 196 194 192 190 188 186 182 180 178 176 174 170 168 166 164 162 160 156 154 152}. The seventh or tenth 52-RU, a feedback tone index may be set as ±{122 120 116 114 112 110 108 106 102 100 98 96 94 90 88 86 84 82 80 76 74 72}. The eighth or ninth 52-RU, a feedback tone index may be set as ±{68 66 62 60 58 56 54 52 48 46 44 42 40 36 34 32 30 28 26 22 20 18}.

Furthermore, in the first or eighth 106-RU, a feedback tone index may be set as ±{498 496 492 490 488 486 484 482 480 478 476 474 472 470 466 464 462 460 458 456 454 452 450 448 446 444 442 440 438 436 434 432 430 428 424 422 420 418 416 414 412 410 408 406 404 402 398 396 394}. In the second or seventh 106-RU, a feedback tone index may be set as ±{364 362 358 356 354 352 350 348 346 344 342 340 338 336 332 330 328 326 324 322 320 318 316 314 312 310 308 306 304 302 300 298 296 294 290 288 286 284 282 280 278 276 274 272 270 268 264 262 260}. In the third or sixth 106-RU, a feedback tone index may be set as ±{256 254 250 248 246 244 242 240 238 236 234 232 230 228 224 222 220 218 216 214 212 210 208 206 204 202 200 198 196 194 192 190 188 186 182 180 178 176 174 172 170 168 166 164 162 160 156 154 152}. In the fourth or fifth 106-RU, a feedback tone index may be set as ±{122 120 116 114 112 110 108 106 104 102 100 98 96 94 90 88 86 84 82 80 78 76 74 72 70 68 66 64 62 60 58 56 54 52 48 46 44 42 40 38 36 34 32 30 28 26 22 20 18}. In the first or fourth 242-RU, a feedback tone index may be set as ±{500 498 496 492 490 488 486 484 482 480 478 476 474 472 470 466 464 462 460 458 456 454 452 450 448 446 444 442 440 438 436 434 432 430 428 424 422 420 418 416 414 412 410 408 406 404 402 398 396 394 392 390 388 386 384 382 380 378 376 374 372 370 368 366 364 362 358 356 354 352 350 348 346 344 342 340 338 336 332 330 328 326 324 322 320 318 316 314 312 310 308 306 304 302 300 298 296 294 290 288 286 284 282 280 278 276 274 272 270 268 264 262 260}. In the second or third 242-RU, a feedback tone index may be set as ±{258 256 254 250 248 246 244 242 240 238 236 234 232 230 228 224 222 220 218 216 214 212 210 208 206 204 202 200 198 196 194 192 190 188 186 182 180 178 176 174 172 170 168 166 164 162 160 156 154 152 150 148 146 144 142 140 138 136 134 132 130 128 126 124 122 120 116 114 112 110 108 106 104 102 100 98 96 94 90 88 86 84 82 80 78 76 74 72 70 68 66 64 62 60 58 56 54 52 48 46 44 42 40 38 36 34 32 30 28 26 22 20 18}. In the first or second 484-RU, a feedback tone index may be set as ±{500 498 496 492 490 488 486 484 482 480 478 476 474 472 470 466 464 462 460 458 456 454 452 450 448 446 444 442 440 438 436 434 432 430 428 424 422 420 418 416 414 412 410 408 406 404 402 398 396 394 392 390 388 386 384 382 380 378 376 374 372 370 368 366 364 362 358 356 354 352 350 348 346 344 342 340 338 336 332 330 328 326 324 322 320 318 316 314 312 310 308 306 304 302 300 298 296 294 290 288 286 284 282 280 278 276 274 272 270 268 264 262 260 258 256 254 250 248 246 244 242 240 238 236 234 232 230 228 224 222 220 218 216 214 212 210 208 206 204 202 200 198 196 194 192 190 188 186 182 180 178 176 174 172 170 168 166 164 162 160 156 154 152 150 148 146 144 142 140 138 136 134 132 130 128 126 124 122 120 116 114 112 110 108 106 104 102 100 98 96 94 90 88 86 84 82 80 78 76 74 72 70 68 66 64 62 60 58 56 54 52 48 46 44 42 40 38 36 34 32 30 28 26 22 20 18}. In the full bandwidth (996-RU), a feedback tone index may be set as ±{500 498 496 494 492 490 488 486 484 482 480 478 476 474 472 470 466 464 462 460 458 456 454 452 450 448 446 444 442 440 438 436 434 432 430 428 426 424 422 420 418 416 414 412 410 408 406 404 402 398 396 394 392 390 388 386 384 382 380 378 376 374 372 370 368 366 364 362 360 358 356 354 352 350 348 346 344 342 340 338 336 332 330 328 326 324 322 320 318 316 314 312 310 308 306 304 302 300 298 296 294 292 290 288 286 284 282 280 278 276 274 272 270 268 264 262 260 258 256 254 252 250 248 246 244 242 240 238 236 234 232 230 228 224 222 220 218 216 214 212 210 208 206 204 202 200 198 196 194 192 190 188 186 184 182 180 178 176 174 172 170 168 166 164 162 160 156 154 152 150 148 146 144 142 140 138 136 134 132 130 128 126 124 122 120 118 116 114 112 110 108 106 104 102 100 98 96 94 90 88 86 84 82 80 78 76 74 72 70 68 66 64 62 60 58 56 54 52 50 48 46 44 42 40 38 36 34 32 30 28 26 22 20 18 16 14 12 10 8 6 4}.

(3).-B) 2× HE-LTF, Ng=4

If a 2× HE-LTF is used and Ng=4, a feedback tone index set for each RU is as follows.

In the first or thirty-seventh 26-RU, a feedback tone index may be set as ±{498 496/492 490 486 482 478 474}. In the second or thirty-sixth 26-RU, a feedback tone index may be set as ±{472 470/466 464 460 456 452 448}. In the third or thirty-fifth 26-RU, a feedback tone index may be set as ±{444 442/438 436 432 428 424 420}. In the fourth or thirty-fourth 26-RU, a feedback tone index may be set as ±{418 416/412 410 406 402 398 394}. In the fifth or thirty-third 26-RU, a feedback tone index may be set as ±{392 388 384 380 376 374/370 368}. In the sixth or thirty-second 26-RU, a feedback tone index may be set as ±{364 362/358 356 352 348 344 340}. In the seventh or thirty-first 26-RU, a feedback tone index may be set as ±{338 336/332 330 326 322 318 314}. In the eighth or thirtieth 26-RU, a feedback tone index may be set as ±{310 308/304 302 298 294 290 286}. In the ninth or twenty-ninth 26-RU, a feedback tone index may be set as ±{284 282/278 276 272 268 264 260}. In the tenth or twenty-eighth 26-RU, a feedback tone index may be set as ±{256 254/250 248 244 240 236 232}. In the eleventh or twenty-seventh 26-RU, a feedback tone index may be set as ±{230 228/224 222 218 214 210 206}. In the twelfth or twenty-sixth 26-RU, a feedback tone index may be set as ±{202 200/196 194 190 186 182 178}. In the thirteenth or twenty-fifth 26-RU, a feedback tone index may be set as ±{176 174/170 168 164 160 156 152}. In the fourteenth or twenty-fourth 26-RU, a feedback tone index may be set as ±{150 146 142 138 134 132/128 126}. In the fifteenth or twenty-third 26-RU, a feedback tone index may be set as ±{122 120/116 114 110 106 102 98}. In the sixteenth or twenty-second 26-RU, a feedback tone index may be set as ±{96 94/90 88 84 80 76 72}. In the seventeenth or twenty-second 26-RU, a feedback tone index may be set as ±{68 66/62 60 56 52 48 44}. In the eighteenth or twentieth 26-RU, a feedback tone index may be set as ±{42 40/36 34 30 26 22 18}. In the nineteenth (middle) 26-RU, a feedback tone index may be set as ±{16 12 8 4}.

Furthermore, in the first or sixteenth 52-RU, a feedback tone index may be set as ±{498 496/492 490 486 482 478 474 470 466 462 458 456/452 450 448} or ±{498 496 492 488 484 482/476 476 472 470/466 464 460 456 452 448}. In the second or fifteenth 52-RU, a feedback tone index may be set as ±{444 442/438 436 432 428 424 420 416 412 408 404 402/398 396 394} or ±{444 442 438 434 430 428/424 422 418 416/412 410 406 402 398 394}. In the third or fourteenth 52-RU, a feedback tone index may be set as ±{364 362/358 356 352 348 344 340 336 332 328 324 322/318 316 314} or ±{364 362 358 354 350 348/344 342 338 336/332 330 326 322 318 314}. In the fourth or thirteenth 52-RU, a feedback tone index may be set as ±{310 308/304 302 298 294 290 286 282 278 274 270 268/264 262 260} or ±{310 308 304 300 296 294/290 288 284 282/278 276 272 268 264 260}. In the fifth or twelfth 52-RU, a feedback tone index may be set as ±{256 254/250 248 244 240 236 232 228 224 220 216 214/210 208 206} or ±{256 254 250 246 242 240/236 234 230 228/224 222 218 214 210 206}. In the sixth or eleventh 52-RU, a feedback tone index may be set as ±{202 200/196 194 190 186 182 178 174 170 166 162 160/156 154 152} or ±{202 200 196 192 188 186/182 180 176 174/170 168 164 160 156 152}. In the seventh or tenth 52-RU, a feedback tone index may be set as ±{122 120/116 114 110 106 102 98 94 90 86 82 80/76 74 72} or ±{122 120 116 112 108 106/102 100 96 94/90 88 84 80 76 72}. In the eighth or ninth 52-RU, a feedback tone index may be set as ±{68 66/62 60 56 52 48 44 40 36 32 28 26/22 20 18} or ±{68 66 62 58 54 52/48 46 42 40/36 34 30 26 22 18}.

Furthermore, in the first or eighth 106-RU, a feedback tone index may be set as ±{498 496/492 490 486 482 478 474 470 466 462 458 454 450 446 442 438 434 430 428/424 422 418 414 410 406 402 398 394}. In the second or seventh 106-RU, a feedback tone index may be set as ±{364 362/358 356 352 348 344 340 336 332 328 324 320 316 312 308 304 300 296 294/290 288 284 280 276 272 268 264 260}. In the third or sixth 106-RU, a feedback tone index may be set as ±{256 254/250 248 244 240 236 232 228 224 220 216 212 208 204 200 196 192 188 186/182 180 176 172 168 164 160 156 152}. In the fourth or fifth 106-RU, a feedback tone index may be set as ±{122 120/116 114 110 106 102 98 94 90 86 82 78 74 70 66 62 58 54 52/48 46 42 38 34 30 26 22 18}. In the first or fourth 242-RU, a feedback tone index may be set as ±{500 496 492 488 484 480 476 472 470/466 464 460 456 452 448 444 440 436 432 428 424 420 416 412 408 404 402/398 396 392 388 384 380 376 372 368 364 362/358 356 352 348 344 340 336 332 328 324 320 316 312 308 304 300 296 294/290 288 284 280 276 272 268 264 260}. In the second or third 242-RU, a feedback tone index may be set as ±{258 254 250 246 242 238 234 230 228/224 222 218 214 210 206 202 198 194 190 186 182 178 174 170 166 162 160/156 154 150 146 142 138 134 130 126 122 120/116 114 110 106 102 98 94 90 86 82 78 74 70 66 62 58 54 52/48 46 42 38 34 30 26 22 18}. In the first or second 484-RU, a feedback tone index may be set as ±{500 496 492 488 484 480 476 472 470/466 464 460 456 452 448 444 440 436 432 428 424 420 416 412 408 404 402/398 396 392 388 384 380 376 372 368 364 362/358 356 352 348 344 340 336 332 328 324 320 316 312 308 304 300 296 294/290 288 284 280 276 272 268 264 260 256 254/250 248 244 240 236 232 228 224 220 216 212 208 204 200 196 192 188 186/182 180 176 172 168 164 160 156 152 148 144 140 136 132 128 124 120 116 112 108 104 100 96 94/90 88 84 80 76 72 68 64 60 56 52 48 44 40 36 32 28 26/22 20 18} or ±{500 498 496/492 490 486 482 478 474 470 466 462 458 454 450 446 442 438 434 430 428/424 422 418 414 410 406 402 398 394 390 386 382 378 374 370 366 362 358 354 350 346 342 338 336/332 330 326 322 318 314 310 306 302 298 294 290 286 282 278 274 270 268/264 262 258 254 250 246 242 238 234 230 228/224 222 218 214 210 206 202 198 194 190 186 182 178 174 170 166 162 160/156 154 150 146 142 138 134 130 126 122 120/116 114 110 106 102 98 94 90 86 82 78 74 70 66 62 58 54 52/48 46 42 38 34 30 26 22 18}. In the full bandwidth (996-RU), a feedback tone index may be set as ±{500 496 492 488 484 480 476 472 470/466 464 460 456 452 448 444 440 436 432 428 424 420 416 412 408 404 402/398 396 392 388 384 380 376 372 368 364 360 356 352 348 344 340 336 332 328 324 320 316 312 308 304 300 296 292 288 284 280 276 272 268 264 260 256 252 248 244 240 236 232 228 224 220 216 212 208 204 200 196 192 188 184 180 176 172 168 164 160 156 152 148 144 140 136 132 128 124 120 116 112 108 104 100 96 94/90 88 84 80 76 72 68 64 60 56 52 48 44 40 36 32 28 26/22 20 16 12 8 4}.

(3)-C) 1× HE-LTF, Ng=4

If a 1× HE-LTF is used and Ng=4, a feedback tone index set for each RU is as follows.

In the first or thirty-seventh 26-RU, a feedback tone index may be set as ±{496 492 488 484 476}. In the second or thirty-sixth 26-RU, a feedback tone index may be set as ±{472 464 460 456 452 448}. In the third or thirty-fifth 26-RU, a feedback tone index may be set as ±{444 436 432 428 424 420}. In the fourth or thirty-fourth 26-RU, a feedback tone index may be set as ±{416 412 408 404 396}. In the fifth or thirty-third 26-RU, a feedback tone index may be set as ±{392 388 384 380 376 368}. In the sixth or thirty-second 26-RU, a feedback tone index may be set as ±{364 356 352 348 344 340}. In the seventh or thirty-first 26-RU, a feedback tone index may be set as ±{336 332 328 324 316}. In the eighth or thirtieth 26-RU, a feedback tone index may be set as ±{308 304 300 296 288}. In the ninth or twenty-ninth 26-RU, a feedback tone index may be set as ±{284 276 272 268 264 260}. In the tenth or twenty-eighth 26-RU, a feedback tone index may be set as ±{256 248 244 240 236 232}. In the eleventh or twenty-seventh 26-RU, a feedback tone index may be set as ±{228 224 220 216 208}. In the twelfth or twenty-sixth 26-RU, a feedback tone index may be set as ±{200 196 192 188 180}. In the thirteenth or twenty-fifth 26-RU, a feedback tone index may be set as ±{176 168 164 160 156 152}. In the fourteenth or twenty-fourth 26-RU, a feedback tone index may be set as ±{148 140 136 132 128}. In the fifteenth or twenty-third 26-RU, a feedback tone index may be set as ±{120 116 112 108 100}. In the sixteenth or twenty-second 26-RU, a feedback tone index may be set as ±{96 88 84 80 76 72}. In the seventeenth or twenty-second 26-RU, a feedback tone index may be set as ±{68 60 56 52 48 44}. In the eighteenth or twentieth 26-RU, a feedback tone index may be set as ±{40 36 32 28 20}. In the nineteenth (middle) 26-RU, a feedback tone index may be set as ±{16 12 8 4}.

Furthermore, in the first or sixteenth 52-RU, a feedback tone index may be set as ±{496 492 488 484 476 472 464 460 456 452 448}. In the second or fifteenth 52-RU, a feedback tone index may be set as ±{444 436 432 428 424 420 416 412 408 404 396}. In the third or fourteenth 52-RU, a feedback tone index may be set as ±{364 356 352 348 344 340 336 332 328 324 316}. In the fourth or thirteenth 52-RU, a feedback tone index may be set as ±{308 304 300 296 288 284 276 272 268 264 260}. In the fifth or twelfth 52-RU, a feedback tone index may be set as ±{256 248 244 240 236 232 228 224 220 216 208}. In the sixth or eleventh 52-RU, a feedback tone index} may be set as ±{200 196 192 188 180 176 168 164 160 156 152. In the seventh or tenth 52-RU, a feedback tone index may be set as ±{120 116 112 108 100 96 88 84 80 76 72}. In the eighth or ninth 52-RU, a feedback tone index may be set as ±{68 60 56 52 48 44 40 36 32 28 20}.

Furthermore, in the first or eighth 106-RU, a feedback tone index may be set as ±{496 492 488 484 480 476 472 464 460 456 452 448 444 440 436 432 428 424 420 416 412 408 404 396}. In the second or seventh 106-RU, a feedback tone index may be set as ±{364 356 352 348 344 340 336 332 328 324 320 316 312 308 304 300 296 288 284 280 276

272 268 264 260}. In the third or sixth 106-RU, a feedback tone index may be set as ±{256 248 244 240 236 232 228 224 220 216 212 208 204 200 196 192 188 180 176 172 168 164 160 156 152}. In the fourth or fifth 106-RU, a feedback tone index may be set as ±{120 116 112 108 104 100 96 88 84 80 76 72 68 64 60 56 52 48 44 40 36 32 28 20}. In the first or fourth 242-RU, a feedback tone index may be set as ±{500 496 492 488 484 480 476 472 464 460 456 452 448 444 440 436 432 428 424 420 416 412 408 404 396 392 388 384 380 376 372 368 364 356 352 348 344 340 336 332 328 324 320 316 312 308 304 300 296 288 284 280 276 272 268 264 260}. In the second or third 242-RU, a feedback tone index may be set as ±{256 248 244 240 236 232 228 224 220 216 212 208 204 200 196 192 188 180 176 172 168 164 160 156 152 148 144 140 136 132 128 124 120 116 112 108 104 100 96 88 84 80 76 72 68 64 60 56 52 48 44 40 36 32 28 20}. In the first or second 484-RU, a feedback tone index may be set as ±{500 496 492 488 484 480 476 472 464 460 456 452 448 444 440 436 432 428 424 420 416 412 408 404 396 392 388 384 380 376 372 368 364 356 352 348 344 340 336 332 328 324 320 316 312 308 304 300 296 288 284 280 276 272 268 264 260 256 248 244 240 236 232 228 224 220 216 212 208 204 200 196 192 188 180 176 172 168 164 160 156 152 148 144 140 136 132 128 124 120 116 112 108 104 100 96 88 84 80 76 72 68 64 60 56 52 48 44 40 36 32 28 20}. In the full bandwidth (996-RU), a feedback tone index may be set as ±{500 496 492 488 484 480 476 472 464 460 456 452 448 444 440 436 432 428 424 420 416 412 408 404 396 392 388 384 380 376 372 368 364 360 356 352 348 344 340 336 332 328 324 320 316 312 308 304 300 296 292 288 284 280 276 272 268 264 260 256 252 248 244 240 236 232 228 224 220 216 212 208 204 200 196 192 188 184 180 176 172 168 164 160 156 152 148 144 140 136 132 128 124 120 116 112 108 104 100 96 88 84 80 76 72 68 64 60 56 52 48 44 40 36 32 28 20 16 12 8 4}.

(3)-D) 2× HE-LTF, Ng=8

If a 2× HE-LTF is used and Ng=8, a feedback tone index set for each RU is as follows.

In the first or thirty-seventh 26-RU, a feedback tone index may be set as ±{498 490 482 474}. In the second or thirty-sixth 26-RU, a feedback tone index may be set as ±{472 464 456 448}. In the third or thirty-fifth 26-RU, a feedback tone index may be set as ±{444 436 428 420}. In the fourth or thirty-fourth 26-RU, a feedback tone index may be set as ±{418 410 402 394}. In the fifth or thirty-third 26-RU, a feedback tone index may be set as ±{392 384 376 368}. In the sixth or thirty-second 26-RU, a feedback tone index may be set as ±{364 356 348 340}. In the seventh or thirty-first 26-RU, a feedback tone index may be set as ±{338 330 322 314}. In the eighth or thirtieth 26-RU, a feedback tone index may be set as ±{310 302 294 286}. In the ninth or twenty-ninth 26-RU, a feedback tone index may be set as ±{284 276 268 260}. In the tenth or twenty-eighth 26-RU, a feedback tone index may be set as ±{256 248 240 232}. In the eleventh or twenty-seventh 26-RU, a feedback tone index may be set as ±{230 222 214 206}. In the twelfth or twenty-sixth 26-RU, a feedback tone index may be set as ±{202 194 186 178}. In the thirteenth or twenty-fifth 26-RU, a feedback tone index may be set as ±{176 168 160 152}. In the fourteenth or twenty-fourth 26-RU, a feedback tone index may be set as ±{150 142 134 126}. In the fifteenth or twenty-third 26-RU, a feedback tone index may be set as ±{122 114 106 98}. In the sixteenth or twenty-second 26-RU, a feedback tone index may be set as ±{96 88 80 72}. In the seventeenth or twenty-second 26-RU, a feedback tone index may be set as ±{68 60 52 44}. In the eighteenth or twentieth 26-RU, a feedback tone index may be set as ±{42 34 26 18}. In the nineteenth (middle) 26-RU, a feedback tone index may be set as ±{16 8 4} or ±{16 12 4}.

Furthermore, in the first or sixteenth 52-RU, a feedback tone index may be set as ±{498 490 482 474 466 458 450 448} or ±{498 496 488 482/478 472 464 456 448}. In the second or fifteenth 52-RU, a feedback tone index may be set as ±{444 436 428 420 412 404 396 394} or ±{444 442 434 428/424 418 410 402 394}. In the third or fourteenth 52-RU, a feedback tone index may be set as ±{364 356 348 340 332 324 316 314} or ±{364 362 354 348/344 338 330 322 314}. In the fourth or thirteenth 52-RU, a feedback tone index may be set as ±{310 302 294 286 278 270 262 260} or ±{310 308 300 294/290 284 276 268 260}. In the fifth or twelfth 52-RU, a feedback tone index may be set as ±{256 248 240 232 224 216 208 206} or ±{256 254 246 240/236 230 222 214 206}. In the sixth or eleventh 52-RU, a feedback tone index may be set as ±{202 194 186 178 170 162 154 152} or ±{202 200 192 186/182 176 168 160 152}. In the seventh or tenth 52-RU, a feedback tone index may be set as ±{122 114 106 98 90 82 74 72} or ±{122 120 112 106/102 96 88 80 72}. In the eighth or ninth 52-RU, a feedback tone index may be set as ±{68 60 52 44 36 28 20 18} or ±{68 66 58 52/48 42 34 26 18}.

Furthermore, in the first or eighth 106-RU, a feedback tone index may be set as ±{498 490 482 474 466 458 450 442 434 428/424 418 410 402 394}. In the second or seventh 106-RU, a feedback tone index may be set as ±{364 356 348 340 332 324 316 308 300 294/290 284 276 268 260}. In the third or sixth 106-RU, a feedback tone index may be set as ±{256 248 240 232 224 216 208 200 192 186/182 176 168 160 152}. In the fourth or fifth 106-RU, a feedback tone index may be set as ±{122 114 106 98 90 82 74 66 58 52/48 42 34 26 18}. In the first or fourth 242-RU, a feedback tone index may be set as ±{500 492 484 476 470/466 460 452 444 436 428 420 412 404 396 388 380 372 364 356 348 340 332 324 316 308 300 294/290 284 276 268 260}. In the second or third 242-RU, a feedback tone index may be set as ±{258 250 242 234 228/224 218 210 202 194 186 178 170 162 154 146 138 130 122 114 106 98 90 82 74 66 58 52/48 42 34 26 18}. In the first or second 484-RU, a feedback tone index may be set as ±{500 492 484 476 470/466 460 452 444 436 428 420 412 404 396 388 380 372 364 356 348 340 332 324 316 308 300 294/290 284 276 268 260 254/250 244 236 228 220 212 204 196 188 180 172 164 156 148 140 132 124 116 108 100 94/90 84 76 68 60 52 44 36 28 20 18} or ±{500 498 490 482 474 466 458 450 442 434 428/424 418 410 402 394 386 378 370 362 354 346 338 330 322 314 306 298 290 282 274 268/264 258 250 242 234 228/224 218 210 202 194 186 178 170 162 154 146 138 130 122 114 106 98 90 82 74 66 58 52/48 42 34 26 18}. In the full bandwidth (996-RU), a feedback tone index may be set as ±{500 492 484 476 470/466 460 452 444 436 428 420 412 404 396 388 380 372 364 356 348 340 332 324 316 308 300 292 284 276 268 260 252 244 236 228 220 212 204 196 188 180 172 164 156 148 140 132 124 116 108 100 94/90 84 76 68 60 52 44 36 28 20 12 4}.

(3)-E) 1× HE-LTF, Ng=8

If a 1× HE-LTF is used and Ng=8, a feedback tone index set for each RU is as follows.

In the first or thirty-seventh 26-RU, a feedback tone index may be set as ±{496 488 484/476 476} or ±{496 492 484 476}. In the second or thirty-sixth 26-RU, a feedback tone index may be set as ±{472 464 456 448}. In the third or thirty-fifth 26-RU, a feedback tone index may be set as ±{444 436 428 420}. In the fourth or thirty-fourth 26-RU, a feedback tone index may be set as ±{416 408 404/396 396} or ±{416 412 404 396}. In the fifth or thirty-third 26-RU, a feedback tone index may be set as ±{392 384 376 368}. In the sixth or thirty-second 26-RU, a feedback tone index may be set as ±{364 356 348 340}. In the seventh or thirty-first 26-RU, a feedback tone index may be set as ±{336 328 324/316 316} or ±{336 332 324 316}. In the eighth or thirtieth 26-RU, a feedback tone index may be set as ±{308 300 296/288 288} or ±{308 304 296 288}. In the ninth or twenty-ninth 26-RU, a feedback tone index may be set as ±{284 276 268 260}. In the tenth or twenty-eighth 26-RU, a feedback tone index may be set as ±{256 248 240 232}. In the eleventh or twenty-seventh 26-RU, a feedback tone index may be set as ±{228 220 216/208 208} or ±{228 224 216 208}. In the twelfth or twenty-sixth 26-RU, a feedback tone index may be set as ±{200 192 188/180 180} or ±{200 196 188 180}. In the thirteenth or twenty-fifth 26-RU, a feedback tone index may be set as ±{176 168 160 152}. In the fourteenth or twenty-fourth 26-RU, a feedback tone index may be set as ±{148 140 132 128} or ±{148 148/140 136 128}. In the fifteenth or twenty-third 26-RU, a feedback tone index may be set as ±{120 112 108/100 100} or ±{120 116 108 100}. In the sixteenth or twenty-second 26-RU, a feedback tone index may be set as ±{96 88 80 72}. In the seventeenth or twenty-second 26-RU, a feedback tone index may be set as ±{68 60 52 44}. In the eighteenth or twentieth 26-RU, a feedback tone index may be set as ±{40 32 28/20 20} or ±{40 36 28 20}. In the nineteenth (middle) 26-RU, a feedback tone index may be set as ±{16 8 4} or ±{16 12 4}.

Furthermore, in the first or sixteenth 52-RU, a feedback tone index may be set as ±{496 488 484/476 472 464 456 448}. In the second or fifteenth 52-RU, a feedback tone index may be set as ±{444 436 428 420 412 404 396}. In the third or fourteenth 52-RU, a feedback tone index may be set as ±{364 356 348 340 332 324 316}. In the fourth or thirteenth 52-RU, a feedback tone index may be set as ±{308 300 296/288 284 276 268 260}. In the fifth or twelfth 52-RU, a feedback tone index may be set as ±{256 248 240 232 224 216 208}. In the sixth or eleventh 52-RU, a feedback tone index may be set as ±{200 192 188/180 176 168 160 152}. In the seventh or tenth 52-RU, a feedback tone index may be set as ±{120 112 108/100 96 88 80 72}. In the eighth or ninth 52-RU, a feedback tone index may be set as ±{68 60 52 44 36 28 20}.

Furthermore, in the first or eighth 106-RU, a feedback tone index may be set as ±{496 488 480 472 464 456 448 440 432 424 416 408 404/396 396} or ±{496 492 484 476 472/464 460 452 444 436 428 420 412 404 396}. In the second or seventh 106-RU, a feedback tone index may be set as ±{364 356 348 340 332 324 316 308 300 296/288 284 276 268 260}. In the third or sixth 106-RU, a feedback tone index may be set as ±{256 248 240 232 224 216 208 200 192 188/180 176 168 160 152}. In the fourth or fifth 106-RU, a feedback tone index may be set as ±{120 112 104 96 88 80 72 64 56 48 40 32 28/20 20} or ±{120 116 108 100 96/88 84 76 68 60 52 44 36 32 20}. In the first or fourth 242-RU, a feedback tone index may be set as ±{500 492 484 476 472/464 460 452 444 436 428 420 412 404 396 388 380 372 364 356 348 340 332 324 316 308 300 296/288 284 276 268 260}. In the second or third 242-RU, a feedback tone index may be set as ±{256 248 240 232 224 216 208 200 192 188/180 176 168 160 152 144 136 128 120 112 104 96 88 80 72 64 56 48 40 32 28/20 20} or ±{256 256/248 244 236 228 220 212 204 196 188 180 172 164 156 148 140 132 124 116 108 100 96/88 84 76 68 60 52 44 36 28 20}. In the first or second 484-RU, a feedback tone index may be set as ±{500 492 484 476 472/464 460 452 444 436 428 420 412 404 396 388 380 372 364 356 348 340 332 324 316 308 300 296/288 284 276 268 260 256/248 244 236 228 220 212 204 196 188 180 172 164 156 148 140 132 124 116 108 100 96/88 84 76 68 60 52 44 36 28 20}. In the full bandwidth (996-RU), a feedback tone index may be set as ±{500 492 484 476 472/464 460 452 444 436 428 420 412 404 396 388 380 372 364 356 348 340 332 324 316 308 300 296/288 284 276 268 260 256/248 244 236 228 220 212 204 196 188 180 172 164 156 148 140 132 124 116 108 100 96/88 84 76 68 60 52 44 36 28 20 12 4}.

(3)-F) 2× HE-LTF, Ng=16

If a 2× HE-LTF is used and Ng=16, a feedback tone index set for each RU is as follows.

In the first or thirty-seventh 26-RU, a feedback tone index may be set as ±{498 482 474} or ±{498 490 474}. In the second or thirty-sixth 26-RU, a feedback tone index may be set as ±{472 456 448} or ±{472 464 448}. In the third or thirty-fifth 26-RU, a feedback tone index may be set as ±{444 428 420} or ±{444 436 420}. In the fourth or thirty-fourth 26-RU, a feedback tone index may be set as ±{418 402 394} or ±{418 410 394}. In the fifth or thirty-third 26-RU, a feedback tone index may be set as ±{392 376 368} or ±{392 384 368}. In the sixth or thirty-second 26-RU, a feedback tone index may be set as ±{364 348 340} or ±{364 356 340}. In the seventh or thirty-first 26-RU, a feedback tone index may be set as ±{338 322 314} or ±{338 330 314}. In the eighth or thirtieth 26-RU, a feedback tone index may be set as ±{310 294 286} or ±{310 302 286}. In the ninth or twenty-ninth 26-RU, a feedback tone index may be set as ±{284 268 260} or ±{284 276 260}. In the tenth or twenty-eighth 26-RU, a feedback tone index may be set as ±{256 240 232} or ±{256 248 232}. In the eleventh or twenty-seventh 26-RU, a feedback tone index may be set as ±{230 214 206} or ±{230 222 206}. In the twelfth or twenty-sixth 26-RU, a feedback tone index may be set as ±{202 186 178} or ±{202 194 178}. In the thirteenth or twenty-fifth 26-RU, a feedback tone index may be set as ±{176 160 152} or ±{176 168 152}. In the fourteenth or twenty-fourth 26-RU, a feedback tone index may be set as ±{150 134 126} or ±{150 142 126}. In the fifteenth or twenty-third 26-RU, a feedback tone index may be set as ±{122 106 98} or ±{122 114 98}. In the sixteenth or twenty-second 26-RU, a feedback tone index may be set as ±{96 80 72} or ±{96 88 72}. In the seventeenth or twenty-second 26-RU, a feedback tone index may be set as ±{68 52 44} or ±{68 60 44}. In the eighteenth or twentieth 26-RU, a feedback tone index may be set as ±{42 26 18} or ±{42 34 18}. In the nineteenth (middle) 26-RU, a feedback tone index may be set as ±{16 4} or ±{164}.

Furthermore, in the first or sixteenth 52-RU, a feedback tone index may be set as ±{498 482 466 450 448} or ±{498 496 482/476 464 448}. In the second or fifteenth 52-RU, a feedback tone index may be set as ±{444 428 412 396 394} or ±{444 442 428/424 410 394}. In the third or fourteenth 52-RU, a feedback tone index may be set as ±{364 348 332 316 314} or ±{364 362 348/344 330 314}. In the fourth or thirteenth 52-RU, a feedback tone index may be set as ±{310 294 278 262 260} or ±{310 308 294/290 276 260}. In the fifth or twelfth 52-RU, a feedback tone index may be set as ±{256 240 224 208 206} or ±{256 254 240/236 222 206}. In the sixth or eleventh 52-RU, a feedback tone index may be set as ±{202 186 170 154 152} or ±{202 200 186/182 168 152}. In the seventh or tenth 52-RU, a feedback tone index may be set as ±{122 106 90 74 72} or ±{122 120 106/102 88 72}. In the eighth or ninth 52-RU, a feedback tone index may be set as ±{68 52 36 20 18} or ±{68 66 52/48 34 18}.

Furthermore, in the first or eighth 106-RU, a feedback tone index may be set as ±{498 482 466 450 434 418 402

394} or ±{498 490 474 458 442 428/424 410 394}. In the second or seventh 106-RU, a feedback tone index may be set as ±{364 348 332 316 300 284 268 260} or ±{364 356 340 324 308 294/290 276 260}. In the third or sixth 106-RU, a feedback tone index may be set as ±{256 240 224 208 192 176 160 152} or ±{256 248 232 216 200 186/182 168 152}. In the fourth or fifth 106-RU, a feedback tone index may be set as ±{122 106 90 74 58 42 26 18} or ±{122 114 98 82 66 52/48 34 18}. In the first or fourth 242-RU, a feedback tone index may be set as ±{500 484 470/466 452 436 420 404 388 372 356 340 324 308 294/290 276 260}. In the second or third 242-RU, a feedback tone index may be set as ±{258 242 228/224 210 194 178 162 146 130 114 98 82 66 52/48 34 18}. In the first or second 484-RU, a feedback tone index may be set as ±{500 484 470/466 452 436 420 404 388 372 356 340 324 308 294/290 276 260 244 228 212 196 180 164 148 132 116 100 84 68 52 36 20 18} or ±{500 498 482 466 450 434 418 402 386 370 354 338 322 306 290 274 258 242 228/224 210 194 178 162 146 130 114 98 82 66 52/48 34 18}. In the full bandwidth (996-RU), a feedback tone index may be set as ±{500 484 470/466 452 436 420 404 388 372 356 340 324 308 292 276 260 244 228 212 196 180 164 148 132 116 100 84 68 52 36 20 4}.

(3)-G) 1× HE-LTF, Ng=16

If a 1× HE-LTF is used and Ng=16, a feedback tone index set for each RU is as follows.

In the first or thirty-seventh 26-RU, a feedback tone index may be set as ±{496 484/476 476} or ±{496 492 476}. In the second or thirty-sixth 26-RU, a feedback tone index may be set as ±{472 456 448} or ±{472 464 448}. In the third or thirty-fifth 26-RU, a feedback tone index may be set as ±{444 428 420} or ±{444 436 420}. In the fourth or thirty-fourth 26-RU, a feedback tone index may be set as ±{416 404/396 396} or ±{416 412 396}. In the fifth or thirty-third 26-RU, a feedback tone index may be set as ±{392 376 368} or ±{392 384 368}. In the sixth or thirty-second 26-RU, a feedback tone index may be set as ±{364 348 340} or ±{364 356 340}. In the seventh or thirty-first 26-RU, a feedback tone index may be set as ±{336 324/316 316} or ±{336 332 316}. In the eighth or thirtieth 26-RU, a feedback tone index may be set as ±{308 296/288 288} or ±{308 304 288}. In the ninth or twenty-ninth 26-RU, a feedback tone index may be set as ±{284 268 260} or ±{284 276 260}. In the tenth or twenty-eighth 26-RU, a feedback tone index may be set as ±{256 240 232} or ±{256 248 232}. In the eleventh or twenty-seventh 26-RU, a feedback tone index may be set as ±{228 216/208 208} or ±{228 224 208}. In the twelfth or twenty-sixth 26-RU, a feedback tone index may be set as ±{200 188/180 180} or ±{200 196 180}. In the thirteenth or twenty-fifth 26-RU, a feedback tone index may be set as ±{176 160 152} or ±{176 168 152}. In the fourteenth or twenty-fourth 26-RU, a feedback tone index may be set as ±{148 132 128} or ±{148 148/140 128}. In the fifteenth or twenty-third 26-RU, a feedback tone index may be set as ±{120 108/100 100} or ±{120 116 100}. In the sixteenth or twenty-second 26-RU, a feedback tone index may be set as ±{96 80 72} or ±{96 88 72}. In the seventeenth or twenty-second 26-RU, a feedback tone index may be set as ±{68 52 44} or ±{68 60 44}. In the eighteenth or twentieth 26-RU, a feedback tone index may be set as ±{40 28/20 20} or ±{40 36 20}. In the nineteenth (middle) 26-RU, a feedback tone index may be set as ±{16 4} or ±{16 4}.

Furthermore, in the first or sixteenth 52-RU, a feedback tone index may be set as ±{496 484/476 464 448}. In the second or fifteenth 52-RU, a feedback tone index may be set as ±{444 428 412 396}. In the third or fourteenth 52-RU, a feedback tone index may be set as ±{364 348 332 316}. In the fourth or thirteenth 52-RU, a feedback tone index may be set as ±{308 296/288 276 260}. In the fifth or twelfth 52-RU may be set as a feedback tone index may be set as ±{256 240 224 208}. In the sixth or eleventh 52-RU, a feedback tone index may be set as ±{200 188/180 168 152}. In the seventh or tenth 52-RU, a feedback tone index may be set as ±{120 108/100 88 72}. In the eighth or ninth 52-RU, a feedback tone index may be set as ±{68 52 36 20}.

Furthermore, in the first or eighth 106-RU, a feedback tone index may be set as ±{496 480 464 448 432 416 404/396 396} or ±{496 492 476 460 444 428 412 396}. In the second or seventh 106-RU, a feedback tone index may be set as ±{364 348 332 316 300 284 268 260} or ±{364 356 340 324 308 296/288 276 260}. In the third or sixth 106-RU, a feedback tone index may be set as ±{256 240 224 208 192 176 160 152} or ±{256 248 232 216 200 188/180 168 152}. In the fourth or fifth 106-RU, a feedback tone index may be set as ±{120 104 88 72 56 40 28/20 20} or ±{120 116 100 84 68 52 36 20}. In the first or fourth 242-RU, a feedback tone index may be set as ±{500 484 472/464 452 436 420 404 388 372 356 340 324 308 296/288 276 260}. In the second or third 242-RU, a feedback tone index may be set as ±{256 240 224 208 192 176 160 144 128 112 96 80 64 48 32 20} or ±{256 244 228 212 196 180 164 148 132 116 100 84 68 52 36 20}. In the first or second 484-RU, a feedback tone index may be set as ±{500 484 472/464 452 436 420 404 388 372 356 340 324 308 296/288 276 260 244 228 212 196 180 164 148 132 116 100 84 68 52 36 20}. In the full bandwidth (996-RU), a feedback tone index may be set as ±{500 484 472/464 452 436 420 404 388 372 356 340 324 308 296/288 276 260 244 228 212 196 180 164 148 132 116 100 84 68 52 36 20 4}.

A method for feeding channel status information back based on a feedback subcarrier determined using the aforementioned method and applying a Q is described below. A beamformee may perform channel estimation in all of subcarriers (in this case, a pilot subcarrier and a null subcarrier are excluded) of each group, may calculate an average channel value of the group, and may feed channel information in a feedback subcarrier back. Furthermore, the beamformee may feed only the channel information, estimated in the feedback subcarrier, back in the feedback subcarrier. A beamformer that has received the channel information forms a Q matrix for the fed-back subcarrier, identically applies the Q matrix formed in the fed-back subcarrier to all of subcarriers within each group, and transmits data (or a downlink frame).

Alternatively, the beamformee feeds only the channel information estimated in the feedback subcarrier back in the feedback subcarrier. The beamformer forms the Q matrix for only the fed-back subcarriers using the feedback information. Thereafter, the beamformer forms a Q matrix to be applied to other subcarriers by interpolating the Q matrix based on the fed-back subcarrier. The reason for this is that channel estimation for a subcarrier on which a value has not been carried in a 2× HE-LTF is obtained through interpolation and thus the Q matrix is also formed through interpolating in order to improve performance.

The fed-back information includes an average SNR (avg SNR), a V matrix, and a delta SNR. The average SNR may correspond to an average SNR of a single time-space stream regardless of an Ng value. The V matrix is transmitted in each feedback tone and is used for a beamformer to form a Q matrix. The delta SNR is transmitted by a difference (or delta) between an SNR in each feedback tone and an average SNR of all of time-space streams.

Figure 16:
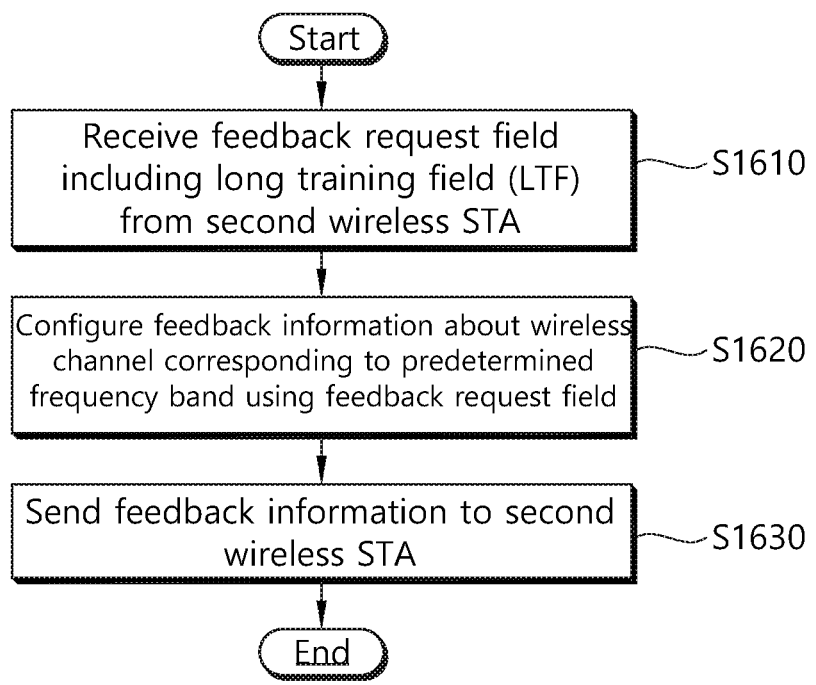
FIG. 16 is a flowchart illustrating a procedure for transmitting a feedback frame based on a sounding procedure according to an embodiment.

FIG. 16 is a flowchart illustrating a procedure for transmitting a feedback frame based on a sounding procedure according to the present embodiment.

Furthermore, FIG. 16 illustrates a method performed by a first wireless STA in a WLAN system supporting a plurality of frequency resource units corresponding to different frequency bands.

First, terms are defined below. The first wireless STA may correspond to a beamformee or an STA, and a second wireless STA may correspond to a beamformer or an AP. The different frequency bands may correspond to 20 MHz, 40 MHz, 80 MHz, etc. The plurality of frequency resource units corresponding to the different frequency bands may correspond to a 26-RU, a 52-RU, a 106-RU, a 242-RU, a 484-RU and/or a 996-RU. The 26-RU is a frequency RU including 26 subcarriers. The 52-RU is a frequency RU including 52 subcarriers. The 106-RU is a frequency RU including 106 subcarriers.

At step S1610, the first wireless STA receives a feedback request field, including a long training field (LTF), from the second wireless STA. The feedback request field including the LTF may correspond to a null data packet (NDP).

At step S1620, the first wireless STA configures feedback information about a wireless channel corresponding to a predetermined frequency band using the feedback request field.

At step S1630, the first wireless STA transmits the feedback information to the second wireless STA.

The feedback information includes channel status information about a predetermined subcarrier index. The predetermined subcarrier index may correspond to a feedback subcarrier index. Furthermore, the predetermined subcarrier index is determined depending on the predetermined number of subcarrier groupings. That is, the channel status information is indicative of a feedback subcarrier for each subcarrier group. In other words, the channel status information indicates where the feedback subcarrier is located within a frequency band.

The subcarrier group is generated based on grouping information in a subcarrier other than a guard subcarrier and a DC subcarrier within a frequency band. That is, the predetermined subcarrier index may be determined depending on the predetermined number of subcarrier groupings other than a guard subcarrier and a DC subcarrier.

For example, if the predetermined frequency band is 20 MHz and the predetermined number of subcarrier groupings is set to 4, the predetermined subcarrier index may be set as {−120, −118 or −114, −112, −108, −104, −100, −96} in a first 26-RU, may be set as {−94, −92 or −88, −86, −82, −78, −74, −70} in a second 26-RU, may be set as {−68, −64, −60, −56, −52, −50 or −46, −44} in a third 26-RU, may be set as {−42, −38, −34, −30, −26, −24 or −20, −18} in a fourth 26-RU, may be set as {−16, −12, −8, −4, 4, 8, 12, 16} in a fifth 26-RU, may be set as {42, 38, 34, 30, 26, 24 or 20, 18} in a sixth 26-RU, may be set as {68, 64, 60, 56, 52, 50 or 46, 44} in a seventh 26-RU, may be set as {94, 92 or 88, 86, 82, 78, 74, 70} in an eighth 26-RU, and may be set as {120, 118 or 114, 112, 108, 104, 100, 96} in a ninth 26-RU.

The predetermined subcarrier index may be set as {−120, −118 or −114, −112, −108, −104, −100, −96, −92, −88, −84, −80, −78 or −74, −72, −70} in a first 52-RU, may be set as {−68, −64, −60, −56, −52, −50 or −46, −44, −40, −38 or −34, −32, −28, −24, −20, −18} or {−68, −66, −64 or −60, −58, −54, −50, −46, −42, −38, −34, −30, −26, −24 or −20, −18} in a second 52-RU, may be set as {68, 64, 60, 56, 52, 50 or 46, 44, 40, 38 or 34, 32, 28, 24, 20, 18} or {68, 66, 64 or 60, 58, 54, 50, 46, 42, 38, 34, 30, 26, 24 or 20, 18} in a third 52-RU, and may be set as {120, 118 or 114, 112, 108, 104, 100, 96, 92, 88, 84, 80, 78 or 74, 72, 70} in a fourth 52-RU.

Furthermore, the predetermined subcarrier index may be set as {−122, −118, −114, −110, −106, −102, −98, −94, −92 or −88, −86, −82, −78, −74, −70, −66, −62, −58, −54, −50, −46, −42, −38, −34, −30, −26, −24 or −20, −18} in a first 106-RU and may be set as {122, 118, 114, 110, 106, 102, 98, 94, 92 or 88, 86, 82, 78, 74, 70, 66, 62, 58, 54, 50, 46, 42, 38, 34, 30, 26, 24 or 20, 18} in a second 106-RU.

For another example, if the predetermined frequency band is 20 MHz and the predetermined number of subcarrier groupings is set to 8, the predetermined subcarrier index may be set as {−120, −112, −104, −96} in a first 26-RU, may be set as {−94, −86, −78, −70} in a second 26-RU, may be set as {−68, −60, −52, −44} in a third 26-RU, may be set as {−42, −34, −26, −18} in a fourth 26-RU, may be set as {−16, −8, −4, 4, 8, 16} or {−16, −12, −4, 4, 12, 16} in a fifth 26-RU, may be set as {42, 34, 26, 18} in a sixth 26-RU, may be set as {68, 60, 52, 44} in a seventh 26-RU, may be set as {94, 86, 78, 70} in an eighth 26-RU, and may be set as {120, 112, 104, 96} in a ninth 26-RU.

The predetermined subcarrier index may be set as {−120, −112, −104, −96, −88, −80, −72, −70} or {−120, −118, −110, −104 or −100, −94, −86, −78, −70} in a first 52-RU, may be set as {−68, −60, −52, −44, −38 or −34, −28, −20, −18} or {−68, −66, −58, −50, −42, −34, −26, −18} in a second 52-RU, may be set as {68, 60, 52, 44, 38 or 34, 28, 20, 18} or {68, 66, 58, 50, 42, 34, 26, 18} in a third 52-RU, and may be set as {120, 112, 104, 96, 88, 80, 72, 70} or {120, 118, 110, 104 or 100, 94, 86, 78, 70} in a fourth 52-RU.

Furthermore, the predetermined subcarrier index may be set as {−122, −114, −106, −98, −92 or −88, −82, −74, −66, −58, −50, −42, −34, −26, −18} in a first 106-RU and may be set as {122, 114, 106, 98, 92 or 88, 82, 74, 66, 58, 50, 42, 34, 26, 18} in a second 106-RU.

For yet another example, if the predetermined frequency band is 20 MHz and the predetermined number of subcarrier groupings is set to 16, the predetermined subcarrier index may be set as {−120, −104, −96} or {−120, −112, −96} in a first 26-RU, may be set as {−94, −78, −70} or {−94, −86, −70} in a second 26-RU, may be set as {−68, −52, −44} or {−68, −60, −44} in a third 26-RU, may be set as {−42, −26, −18} or {−42, −34, −18} in a fourth 26-RU, may be set as {−16, −4, 4, 16} in a fifth 26-RU, may be set as {42, 26, 18} or {42, 34, 18} in a sixth 26-RU, may be set as {68, 52, 44} or {68, 60, 44} in a seventh 26-RU, may be set as {94, 78, 70} or {94, 86, 70} in an eighth 26-RU, and may be set as {120, 104, 96} or {120, 112, 96} in a ninth 26-RU.

The predetermined subcarrier index may be set as {−120, −104, −88, −72, −70} or {−120, −118, −104 or −100, −86, −70} in a first 52-RU, may be set as {−68, −52, −38 or −34, −20, −18} or {−68, −66, −50, −34, −18} in a second 52-RU, may be set as {68, 52, 38 or 34, 20, 18} or {68, 66, 50, 34, 18} in a third 52-RU, and may be set as {120, 104, 88, 72, 70} or {120, 118, 104 or 100, 86, 70} in a fourth 52-RU.

Furthermore, the predetermined subcarrier index may be set as {−122, −106, −92 or −88, −74, −58, −42, −26, −18} or {−122, −114, −98, −82, −66, −50, −34, −18} in a first 106-RU and may be set as {122, 106, 92 or 88, 74, 58, 42, 26, 18} or {122, 114, 98, 82, 66, 50, 34, 18} in a second 106-RU.

The predetermined subcarrier index is not limited to the aforementioned examples and may be set in various manners according to embodiments. The WLAN system supports a plurality of frequency resource units corresponding to different frequency bands. Thus, the predetermined frequency band may be 40 MHz or 80 MHz, and the predetermined subcarrier index may be set in each RU by configuring all of RUs which may be combined within the predetermined frequency band.

If the predetermined subcarrier index overlaps a pilot subcarrier index, the overlapped subcarrier index may be set again as a neighboring subcarrier index at which an LTF coefficient is located. That is, if a feedback subcarrier and a pilot subcarrier overlap, a feedback subcarrier may be set as another neighboring subcarrier index. In this case, the number of samples used to form a Q matrix may be increased in a transmission stage (or a beamformer).

If the predetermined subcarrier index overlaps a null subcarrier index, the overlapped subcarrier index may be set again as a neighboring subcarrier index at which an LTF coefficient is located. That is, if a feedback subcarrier and a null subcarrier (or a leftover tone) overlap, another neighbor subcarrier may be added and fed back. More specifically, in a resource unit (RU) having a small size, it is necessary to additionally feed a signal back in a neighboring subcarrier because the signal is not transferred in a null subcarrier.

Furthermore, the channel status information includes average channel information estimated in a subcarrier other than the null subcarrier and the pilot subcarrier within the subcarrier group or channel information estimated in the feedback subcarrier. That is, the former can help performance due to a smoothing effect obtained because an average channel information value is fed back in all of subcarriers (in this case, except a null subcarrier and a pilot subcarrier) within a subcarrier group. The latter has an advantage in that overhead attributable a computational load can be reduced because only channel information estimated in a feedback subcarrier is fed back and thus it is not necessary to obtain an average channel information value of all of subcarriers. The channel status information is transmitted through the feedback subcarrier.

Furthermore, the feedback request field further includes a legacy-long training field (L-LFT). The size of inverse fast Fourier transform (IFFT) applied to the LTF may be one times or twice the size of IFFT applied to the L-LTF. That is, the aforementioned method may use an NDP to which a 1×-LTF or 2×-LTF has been applied in order to perform a sounding procedure.

Figure 17:
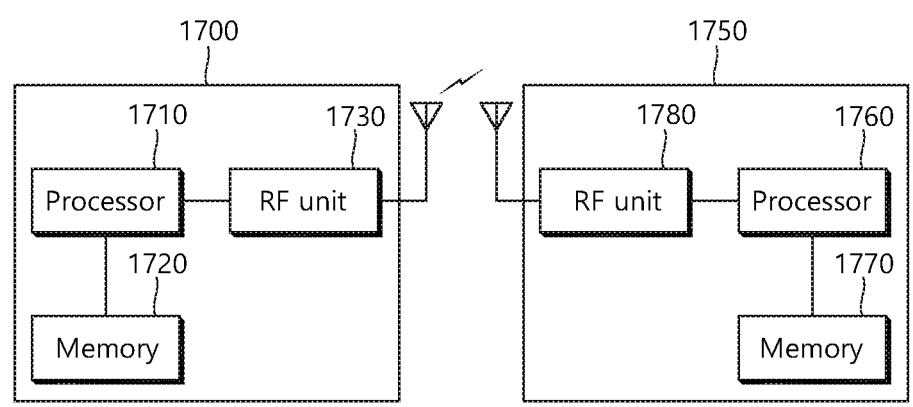
FIG. 17 is a block diagram of a wireless device according to an embodiment of the present invention.

FIG. 17 is a block diagram of a wireless device according to an embodiment of the present invention.

Referring to FIG. 17, as a station (STA) that can realize the above-described exemplary embodiment, the wireless device may correspond to an AP or a non-AP station (non-AP STA). The wireless device may correspond to the above 0 described user or may correspond to a transmitting device transmitting a signal to the user.

The AP 1700 includes a processor 1710, a memory 1720, and a radio frequency unit (RF unit) 1730.

The RF unit 1730 is connected to the processor 1710, thereby being capable of transmitting and/or receiving radio signals.

The processor 1710 implements the functions, processes, and/or methods proposed in this specification. For example, the processor 1710 may be realized to perform the operations according to the above-described exemplary embodiments of the present invention. More specifically, the processor 1710 may perform the operations that can be performed by the AP, among the operations that are disclosed in the exemplary embodiments of FIG. 1 to FIG. 16.

The non-AP STA 1750 includes a processor 1760, a memory 1770, and a radio frequency unit (RF unit) 1780.

The RF unit 1780 is connected to the processor 1760, thereby being capable of transmitting and/or receiving radio signals.

The processor 1760 may implement the functions, processes, and/or methods proposed in the exemplary embodiment of the present invention. For example, the processor 1760 may be realized to perform the non-AP STA operations according to the above-described exemplary embodiments of the present invention. The processor may perform the operations of the non-AP STA, which are disclosed in the exemplary embodiments of FIG. 1 to FIG. 16.

The processor 1710 and 1760 may include an application-specific integrated circuit (ASIC), another chip set, a logical circuit, a data processing device, and/or a converter converting a baseband signal and a radio signal to and from one another. The memory 1720 and 1770 may include a read-only memory (ROM), a random access memory (RAM), a flash memory, a memory card, a storage medium, and/or another storage device. The RF unit 1730 and 1780 may include one or more antennas transmitting and/or receiving radio signals.

When the exemplary embodiment is implemented as software, the above-described method may be implemented as a module (process, function, and so on) performing the above-described functions. The module may be stored in the memory 1720 and 1770 and may be executed by the processor 1710 and 1760. The memory 1720 and 1770 may be located inside or outside of the processor 1710 and 1760 and may be connected to the processor 1710 and 1760 through a diversity of well-known means.

What is claimed is:
1. A method performed by a first wireless STA of a WLAN system supporting a plurality of frequency resource units (RUs) corresponding to different frequency bands, the method comprising:
  receiving a feedback request field comprising a long training field (LTF) from a second wireless STA;
  configuring feedback information about a wireless channel corresponding to a predetermined frequency band using the feedback request field,
  wherein the feedback information comprises channel status information about a predetermined subcarrier index,
  the predetermined subcarrier index is determined depending on a predetermined number of subcarrier groupings, and
  if the predetermined frequency band is 20 MHz and the predetermined number of subcarrier groupings is set to 4, the predetermined subcarrier index is set as:
  {−120, −118 or −114, −112, −108, −104, −100, −96} in a first 26-RU,
  {−94, −92 or −88, −86, −82, −78, −74, −70} in a second 26-RU,
  {−68, −64, −60, −56, −52, −50 or −46, −44} in a third 26-RU,
  {−42, −38, −34, −30, −26, −24 or −20, −18} in a fourth 26-RU,
  {−16, −12, −8, −4, 4, 8, 12, 16} in a fifth 26-RU,
  {42, 38, 34, 30, 26, 24 or 20, 18} in a sixth 26-RU,
  {68, 64, 60, 56, 52, 50 or 46, 44} in a seventh 26-RU,
  {94, 92 or 88, 86, 82, 78, 74, 70} in an eighth 26-RU,
  {120, 118 or 114, 112, 108, 104, 100, 96} in a ninth 26-RU,
  {−120, −118 or −114, −112, −108, −104, −100, −96, −92, −88, −84, −80, −78 or −74, −72, −70} in a first 52-RU,
  {−68, −64, −60, −56, −52, −50 or −46, −44, −40, −38 or −34, −32, −28, −24, −20, −18} or {−68,

−66, −64 or −60, −58, −54, −50, −46, −42, −38, −34, −30, −26, −24 or −20, −18} in a second 52-RU,
{68, 64, 60, 56, 52, 50 or 46, 44, 40, 38 or 34, 32, 28, 24, 20, 18} or {68, 66, 64 or 60, 58, 54, 50, 46, 42, 38, 34, 30, 26, 24 or 20, 18} in a third 52-RU,
{120, 118 or 114, 112, 108, 104, 100, 96, 92, 88, 84, 80, 78 or 74, 72, 70} in a fourth 52-RU,
{−122, −118, −114, −110, −106, −102, −98, −94, −92 or −88, −86, −82, −78, −74, −70, −66, −62, −58, −54, −50, −46, −42, −38, −34, −30, −26, −24 or −20, −18} in a first 106-RU, and
{122, 118, 114, 110, 106, 102, 98, 94, 92 or 88, 86, 82, 78, 74, 70, 66, 62, 58, 54, 50, 46, 42, 38, 34, 30, 26, 24 or 20, 18} in a second 106-RU; and
transmitting the feedback information to the second wireless STA,
wherein the 26-RU is a frequency RU comprising 26 subcarriers, the 52-RU is a frequency RU comprising 52 subcarriers, and the 106-RU is a frequency RU comprising 106 subcarriers.

2. The method of claim 1, wherein if the predetermined frequency band is 20 MHz and the predetermined number of subcarrier groupings is set to 8, the predetermined subcarrier index is set as:
{−120, −112, −104, −96} in the first 26-RU,
{−94, −86, −78, −70} in the second 26-RU,
{−68, −60, −52, −44} in the third 26-RU,
{−42, −34, −26, −18} in the fourth 26-RU,
{−16, −8, −4, 4, 8, 16} or {−16, −12, −4, 4, 12, 16} in the fifth 26-RU,
{42, 34, 26, 18} in the sixth 26-RU,
{68, 60, 52, 44} in the seventh 26-RU,
{94, 86, 78, 70} in the eighth 26-RU,
{120, 112, 104, 96} in the ninth 26-RU,
{−120, −112, −104, −96, −88, −80, −72, −70} or {−120, −118, −110, −104 or −100, −94, −86, −78, −70} the first 52-RU,
{−68, −60, −52, −44, −38 or −34, −28, −20, −18} or {−68, −66, −58, −50, −42, −34, −26, −18} in the second 52-RU,
{68, 60, 52, 44, 38 or 34, 28, 20, 18} or {68, 66, 58, 50, 42, 34, 26, 18} in the third 52-RU,
{120, 112, 104, 96, 88, 80, 72, 70} or {120, 118, 110, 104 or 100, 94, 86, 78, 70} in the fourth 52-RU,
{−122, −114, −106, −98, −92 or −88, −82, −74, −66, −58, −50, −42, −34, −26, −18} in the first 106-RU, and
{122, 114, 106, 98, 92 or 88, 82, 74, 66, 58, 50, 42, 34, 26, 18} in the second 106-RU.

3. The method of claim 1, wherein if the predetermined frequency band is 20 MHz and the predetermined number of subcarrier groupings is set to 16, the predetermined subcarrier index is set as:
{−120, −104, −96} or {−120, −112, −96} in the first 26-RU,
{−94, −78, −70} or {−94, −86, −70} in the second 26-RU,
{−68, −52, −44} or {−68, −60, −44} in the third 26-RU,
{−42, −26, −18} or {−42, −34, −18} in the fourth 26-RU,
{−16, −4, 4, 16} in the fifth 26-RU,
{42, 26, 18} or {42, 34, 18} in the sixth 26-RU,
{68, 52, 44} or {68, 60, 44} in the seventh 26-RU,
{94, 78, 70} or {94, 86, 70} in the eighth 26-RU,
{120, 104, 96} or {120, 112, 96} in the ninth 26-RU,
{−120, −104, −88, −72, −70} or {−120, −118, −104 or −100, −86, −70} in the first 52-RU,
{−68, −52, −38 or −34, −20, −18} or {−68, −66, −50, −34, −18} in the second 52-RU,
{68, 52, 38 or 34, 20, 18} or {68, 66, 50, 34, 18} in the third 52-RU,
{120, 104, 88, 72, 70} or {120, 118, 104 or 100, 86, 70} in the fourth 52-RU,
{−122, −106, −92 or −88, −74, −58, −42, −26, −18} or {−122, −114, −98, −82, −66, −50, −34, −18} in the first 106-RU, and
{122, 106, 92 or 88, 74, 58, 42, 26, 18} or {122, 114, 98, 82, 66, 50, 34, 18} in the second 106-RU.

4. The method of claim 1, wherein if the predetermined subcarrier index overlaps a pilot subcarrier index, the overlapped subcarrier index is set as a neighboring subcarrier index at which an LTF coefficient is located again.

5. The method of claim 1, wherein:
the feedback request field further comprises a legacy-long training field (L-LFT), and
a size of inverse fast Fourier transform (IFFT) applied to the LTF is twice a size of IFFT applied to the L-LTF.

6. A first wireless STA performing communication in a WLAN system supporting a plurality of frequency resource units corresponding to different frequency bands, the first wireless STA comprising:
a radio frequency (RF) unit transmitting and receiving a radio signal; and
a processor operatively connected to the RF unit, wherein the processor:
receive a feedback request field comprising a long training field (LTF) from a second wireless STA;
configure feedback information about a wireless channel corresponding to a predetermined frequency band using the feedback request field,
wherein the feedback information comprises channel status information about a predetermined subcarrier index,
the predetermined subcarrier index is determined depending on a predetermined number of subcarrier groupings, and
if the predetermined frequency band is 20 MHz and the predetermined number of subcarrier groupings is set to 4, the predetermined subcarrier index is set as:
{−120, −118 or −114, −112, −108, −104, −100, −96} in a first 26-RU,
{−94, −92 or −88, −86, −82, −78, −74, −70} in a second 26-RU,
{−68, −64, −60, −56, −52, −50 or −46, −44} in a third 26-RU,
{−42, −38, −34, −30, −26, −24 or −20, −18} in a fourth 26-RU,
{−16, −12, −8, −4, 4, 8, 12, 16} in a fifth 26-RU,
{42, 38, 34, 30, 26, 24 or 20, 18} in a sixth 26-RU,
{68, 64, 60, 56, 52, 50 or 46, 44} in a seventh 26-RU,
{94, 92 or 88, 86, 82, 78, 74, 70} in an eighth 26-RU,
{120, 118 or 114, 112, 108, 104, 100, 96} in a ninth 26-RU,
{−120, −118 or −114, −112, −108, −104, −100, −96, −92, −88, −84, −80, −78 or −74, −72, −70} in a first 52-RU,
{−68, −64, −60, −56, −52, −50 or −46, −44, −40, −38 or −34, −32, −28, −24, −20, −18} or {−68, −66, −64 or −60, −58, −54, −50, −46, −42, −38, −34, −30, −26, −24 or −20, −18} in a second 52-RU,
{68, 64, 60, 56, 52, 50 or 46, 44, 40, 38 or 34, 32, 28, 24, 20, 18} or {68, 66, 64 or 60, 58, 54, 50, 46, 42, 38, 34, 30, 26, 24 or 20, 18} in a third 52-RU,
{120, 118 or 114, 112, 108, 104, 100, 96, 92, 88, 84, 80, 78 or 74, 72, 70} in a fourth 52-RU, {−122, −118, −114, −110, −106, −102, −98, −94, −92 or −88, −86, −82, −78, −74, −70, −66, −62, −58, −54, −50, −46, −42, −38, −34, −30, −26, −24 or −20, −18} in a first 106-RU, and {122, 118, 114, 110, 106, 102, 98, 94, 92 or 88, 86, 82, 78, 74, 70, 66, 62, 58, 54, 50, 46, 42, 38, 34, 30, 26, 24 or 20, 18} in a second 106-RU; and transmitting the feedback information to the second wireless STA, wherein the 26-RU is a frequency RU comprising 26 subcarriers, the 52-RU is a frequency RU comprising 52 subcarriers, and the 106-RU is a frequency RU comprising 106 subcarriers.

7. The first wireless STA of claim 6, wherein if the predetermined frequency band is 20 MHz and the predetermined number of subcarrier groupings is set to 8, the predetermined subcarrier index is set as:

{−120, −112, −104, −96} in the first 26-RU,
{−94, −86, −78, −70} in the second 26-RU,
{−68, −60, −52, −44} in the third 26-RU,
{−42, −34, −26, −18} in the fourth 26-RU,
{−16, −8, −4, 4, 8, 16} or {−16, −12, −4, 4, 12, 16} in the fifth 26-RU,
{42, 34, 26, 18} in the sixth 26-RU,
{68, 60, 52, 44} in the seventh 26-RU,
{94, 86, 78, 70} in the eighth 26-RU,
{120, 112, 104, 96} in the ninth 26-RU,
{−120, −112, −104, −96, −88, −80, −72, −70} or {−120, −118, −110, −104 or −100, −94, −86, −78, −70} the first 52-RU,
{−68, −60, −52, −44, −38 or −34, −28, −20, −18} or {−68, −66, −58, −50, −42, −34, −26, −18} in the second 52-RU,
{68, 60, 52, 44, 38 or 34, 28, 20, 18} or {68, 66, 58, 50, 42, 34, 26, 18} in the third 52-RU,
{120, 112, 104, 96, 88, 80, 72, 70} or {120, 118, 110, 104 or 100, 94, 86, 78, 70} in the fourth 52-RU,
{−122, −114, −106, −98, −92 or −88, −82, −74, −66, −58, −50, −42, −34, −26, −18} in the first 106-RU, and {122, 114, 106, 98, 92 or 88, 82, 74, 66, 58, 50, 42, 34, 26, 18} in the second 106-RU.

8. The first wireless STA of claim 6, wherein if the predetermined frequency band is 20 MHz and the predetermined number of subcarrier groupings is set to 16, the predetermined subcarrier index is set as:

{−120, −104, −96} or {−120, −112, −96} in the first 26-RU,
{−94, −78, −70} or {−94, −86, −70} in the second 26-RU,
{−68, −52, −44} or {−68, −60, −44} in the third 26-RU,
{−42, −26, −18} or {−42, −34, −18} in the fourth 26-RU,
{−16, −4, 4, 16} in the fifth 26-RU,
{42, 26, 18} or {42, 34, 18} in the sixth 26-RU,
{68, 52, 44} or {68, 60, 44} in the seventh 26-RU,
{94, 78, 70} or {94, 86, 70} in the eighth 26-RU,
{120, 104, 96} or {120, 112, 96} in the ninth 26-RU,
{−120, −104, −88, −72, −70} or {−120, −118, −104 or −100, −86, −70} in the first 52-RU,
{−68, −52, −38 or −34, −20, −18} or {−68, −66, −50, −34, −18} in the second 52-RU,
{68, 52, 38 or 34, 20, 18} or {68, 66, 50, 34, 18} in the third 52-RU,
{120, 104, 88, 72, 70} or {120, 118, 104 or 100, 86, 70} in the fourth 52-RU,
{−122, −106, −92 or −88, −74, −58, −42, −26, −18} or {−122, −114, −98, −82, −66, −50, −34, −18} in the first 106-RU, and
{122, 106, 92 or 88, 74, 58, 42, 26, 18} or {122, 114, 98, 82, 66, 50, 34, 18} in the second 106-RU.

9. The first wireless STA of claim 6, wherein if the predetermined subcarrier index overlaps a pilot subcarrier index, the overlapped subcarrier index is set as a neighboring subcarrier index at which an LTF coefficient is located again.

10. The first wireless STA of claim 6, wherein:
the feedback request field further comprises a legacy-long training field (L-LFT), and
a size of inverse fast Fourier transform (IFFT) applied to the LTF is twice a size of IFFT applied to the L-LTF.

* * * * *